United States Patent
Mochizuki et al.

(10) Patent No.: US 9,841,665 B2
(45) Date of Patent: *Dec. 12, 2017

(54) INFORMATION PROCESSING APPARATUS AND INFORMATION PROCESSING METHOD TO MODIFY AN IMAGE BASED ON AUDIO DATA

(71) Applicant: Sony Corporation, Tokyo (JP)

(72) Inventors: Daisuke Mochizuki, Chiba (JP);
Kazuto Nishizawa, Kanagawa (JP);
Mitsuo Okumura, Tokyo (JP);
Takaomi Kimura, Tokyo (JP);
Tomohiko Gotoh, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 419 days.

This patent is subject to a terminal disclaimer.

(21) Appl. No.: 14/478,606

(22) Filed: Sep. 5, 2014

(65) Prior Publication Data

US 2014/0376888 A1 Dec. 25, 2014

Related U.S. Application Data

(63) Continuation of application No. 12/557,858, filed on Sep. 11, 2009, now Pat. No. 8,891,909.

(30) Foreign Application Priority Data

Oct. 10, 2008 (JP) .................................. 2008-264564

(51) Int. Cl.
*G06K 9/00* (2006.01)
*G03B 31/06* (2006.01)
(Continued)

(52) U.S. Cl.
CPC ............... *G03B 31/06* (2013.01); *G06K 9/46* (2013.01); *G06T 5/00* (2013.01); *G06T 13/00* (2013.01);
(Continued)

(58) Field of Classification Search
CPC .................................. G03B 31/06; G06K 9/46
See application file for complete search history.

(56) References Cited

U.S. PATENT DOCUMENTS 5,250,747 A 10/1993 Tsumura
5,262,765 A 11/1993 Tsumura et al.
(Continued)

FOREIGN PATENT DOCUMENTS

JP 2006-166164 6/2006

OTHER PUBLICATIONS

Abdelwahab Zramdini et al. "Optical Font Recognition Using Typographical Features", Aug. 1998, IEEE Transactions on Pattern Analysis and Machine Intelligence, vol. 20, No. 8, p. 877-882.

*Primary Examiner* — Gandhi Thirugnanam
(74) *Attorney, Agent, or Firm* — Chip Law Group

(57) ABSTRACT

An information processing apparatus is provided that includes a playback unit to play back music data, an analysis unit to analyze a feature of a relevant image of the music data, an image correction unit to perform image correction with use of any of a plurality of correction types, a storage unit to store one or more than one image, a selection unit to select a correction type corresponding to the feature of the relevant image analyzed by the analysis unit from the plurality of correction types, a correction control unit to cause the image correction unit to perform image correction of an image stored in the storage unit with use of the correction type selected by the selection unit, and an output unit to output the image corrected by the image correction unit.

8 Claims, 28 Drawing Sheets

(51) Int. Cl.
*G06T 5/00* (2006.01)
*G06T 13/00* (2011.01)
*G06K 9/46* (2006.01)
*G11B 27/034* (2006.01)
*H04N 5/76* (2006.01)
*H04N 9/82* (2006.01)

(52) U.S. Cl.
CPC ............ *G11B 27/034* (2013.01); *H04N 5/76* (2013.01); *H04N 9/8211* (2013.01); *H04N 9/8233* (2013.01)

(56) References Cited

U.S. PATENT DOCUMENTS

| | | | |
|---|---|---|---|
| 5,496,178 A | 3/1996 | Back | |
| 5,617,385 A | 4/1997 | Lee et al. | |
| 5,683,253 A | 11/1997 | Park et al. | |
| 5,726,373 A | 3/1998 | Choi et al. | |
| 5,810,603 A | 9/1998 | Kato et al. | |
| 5,900,566 A | 5/1999 | Mino et al. | |
| 6,077,084 A | 6/2000 | Mino et al. | |
| 6,139,329 A | 10/2000 | Mino et al. | |
| 6,288,990 B1* | 9/2001 | Fujiie | G10H 1/363 369/275.3 |
| 6,537,078 B2 | 3/2003 | Jean | |
| 6,779,116 B2 | 8/2004 | Tagawa et al. | |
| 6,898,759 B1 | 5/2005 | Terada et al. | |
| 7,181,091 B2 | 2/2007 | Yoda | |
| 7,250,567 B2 | 7/2007 | Gayama | |
| 7,327,640 B2 | 2/2008 | Tange et al. | |
| 7,394,969 B2 | 7/2008 | Sun et al. | |
| 7,469,064 B2 | 12/2008 | Furuya et al. | |
| 7,478,323 B2 | 1/2009 | Dowdy | |
| 7,606,741 B2 | 10/2009 | King et al. | |
| 7,745,718 B2* | 6/2010 | Makino | G06F 17/30743 84/615 |
| 8,255,428 B2 | 8/2012 | Bull et al. | |
| 8,259,192 B2 | 9/2012 | Nair | |
| 8,626,236 B2* | 1/2014 | Lindner | G06F 17/289 382/182 |
| 8,855,798 B2* | 10/2014 | DiMaria | G06F 17/30038 345/440 |
| 8,891,909 B2* | 11/2014 | Mochizuki | G06T 5/00 382/305 |
| 2002/0131652 A1 | 9/2002 | Yoda | |
| 2003/0027120 A1 | 2/2003 | Jean | |
| 2003/0085913 A1 | 5/2003 | Ahmad et al. | |
| 2003/0158838 A1* | 8/2003 | Okusa | G06F 17/30244 |
| 2004/0095379 A1 | 5/2004 | Chang et al. | |
| 2004/0114904 A1 | 6/2004 | Sun et al. | |
| 2004/0197084 A1 | 10/2004 | Tagawa et al. | |
| 2005/0220349 A1 | 10/2005 | Furuya et al. | |
| 2006/0056796 A1 | 3/2006 | Nishizawa et al. | |
| 2006/0155401 A1 | 7/2006 | Matsuzaki et al. | |
| 2006/0206811 A1 | 9/2006 | Dowdy | |
| 2006/0230038 A1* | 10/2006 | Silverman | G06F 17/30017 |
| 2006/0294453 A1* | 12/2006 | Hirata | G10L 15/26 715/203 |
| 2007/0086665 A1 | 4/2007 | Kim et al. | |
| 2007/0133842 A1* | 6/2007 | Harrington | G06K 9/00463 382/112 |
| 2007/0168852 A1 | 7/2007 | Erol et al. | |
| 2007/0211961 A1 | 9/2007 | Sugimoto | |
| 2007/0253641 A1 | 11/2007 | Saito | |
| 2007/0261534 A1 | 11/2007 | Allen | |
| 2007/0287141 A1 | 12/2007 | Milner | |
| 2008/0066611 A1* | 3/2008 | Makino | G10H 1/0008 84/609 |
| 2008/0104516 A1 | 5/2008 | Lee | |
| 2008/0152324 A1* | 6/2008 | Kaneko | G11B 27/034 386/335 |
| 2008/0178068 A1 | 7/2008 | Chaudhri | |
| 2008/0232695 A1 | 9/2008 | Noda et al. | |
| 2008/0232697 A1 | 9/2008 | Chen et al. | |
| 2008/0247458 A1 | 10/2008 | Sun et al. | |
| 2008/0274687 A1 | 11/2008 | Roberts et al. | |
| 2009/0080698 A1 | 3/2009 | Mihara et al. | |
| 2009/0217167 A1 | 8/2009 | Sugama et al. | |
| 2010/0092107 A1 | 4/2010 | Mochizuki et al. | |
| 2010/0094441 A1 | 4/2010 | Mochizuki et al. | |
| 2011/0243447 A1* | 10/2011 | Meulenbroeks | G10L 13/00 382/182 |

* cited by examiner

FIG. 8

| MOTION PATTERN 01 | START POINT | END POINT |
|---|---|---|
| POSITION (X, Y, Z): | 452, 345, 489 | 262, 243, 1237 |
| SCALE (%): | 165% | 165% |
| X-ROTATION: | −2° | −2° |
| Y-ROTATION: | −28° | +33° |
| Z-ROTATION: | 0° | 0° |

| MOTION PATTERN 02 | START POINT | END POINT |
|---|---|---|
| POSITION (X, Y, Z): | 396, 213, 826 | 324, 305, 529 |
| SCALE (%): | 175% | 175% |
| X-ROTATION: | −29° | 43° |
| Y-ROTATION: | 17° | 0° |
| Z-ROTATION: | 0° | 0° |

| MOTION PATTERN 03 | START POINT | END POINT |
|---|---|---|
| POSITION (X, Y, Z): | 480, 270, −44 | 934, 190, 1012 |
| SCALE (%): | 194% | 194% |
| X-ROTATION: | 0° | 0° |
| Y-ROTATION: | 15° | −33° |
| Z-ROTATION: | 0° | 0° |

| MOTION PATTERN 04 | START POINT | END POINT |
|---|---|---|
| POSITION (X, Y, Z): | 480, 270, −110 | 501, 373, 1366 |
| SCALE (%): | 170% | 170% |
| X-ROTATION: | −20° | 16° |
| Y-ROTATION: | 20° | −23° |
| Z-ROTATION: | 0° | 0° |

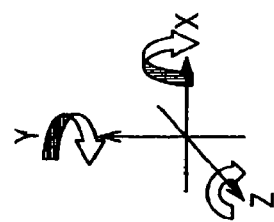
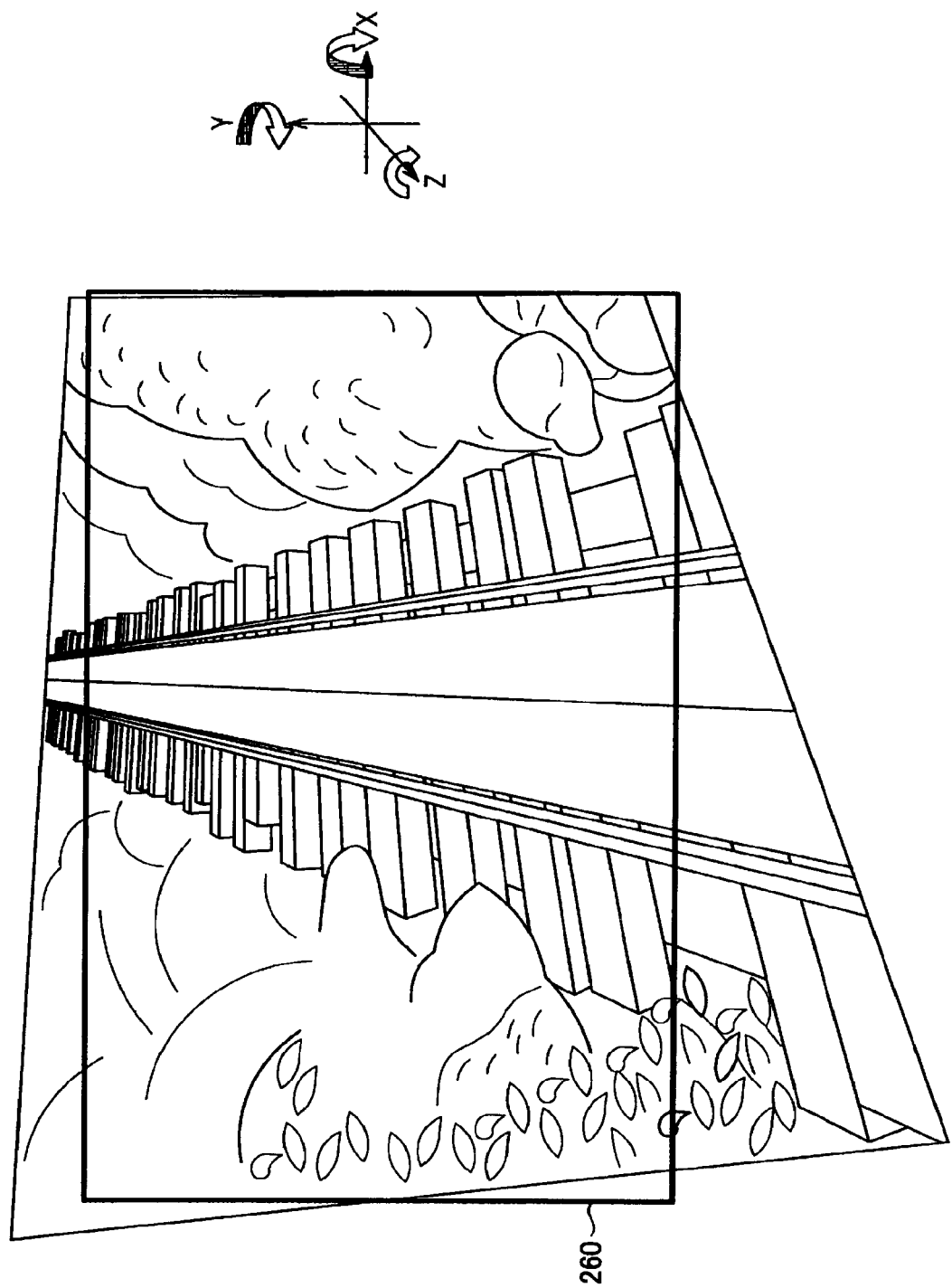
FIG. 9

FIG. 16

|  |  |  |
|---|---|---|
| $+\frac{x}{3}$ | $+\frac{x}{2}$ | $+\frac{x}{3}$ |
| $+\frac{x}{2}$ | $+x$ (PIXEL C) | $+\frac{x}{2}$ |
| $+\frac{x}{3}$ | $+\frac{x}{2}$ | $+\frac{x}{3}$ |

FIG. 33

| テーマの曲集 | Energetic | Relaxing | Dramatic | Happy | Electronic |
|---|---|---|---|---|---|
| 対応するフォント | Helvetica Neue 95 Black | Bauer Bodoni Regular | Edwardian Script ITC | Cooper Black | Repetition Scrolling |

FIG. 35

CLASSIC  POPS  *jazz*  ROCK

INFORMATION PROCESSING APPARATUS AND INFORMATION PROCESSING METHOD TO MODIFY AN IMAGE BASED ON AUDIO DATA

This is a continuation of application Ser. No. 12/557,858, filed Sep. 11, 2009, which claims the right to priority based on Japanese Patent Application No. P2008-264564, filed Oct. 10, 2008, all of which are incorporated herein by reference.

BACKGROUND OF THE INVENTION

Field of the Invention

The present invention relates to an information processing apparatus, a program, and an information processing method.

Description of the Related Art

Digital cameras are widely used today, and editing of a photographic image captured by a digital camera on a PC, execution of a slideshow that sequentially displays photographic images and so on are popularly practiced.

Although playback of music and display of photographic images have been performed independently in a slideshow, a slideshow can be performed by the following methods.

(1) Adjusting the timing of switching photographic images based on music progression information such as music progression or beats.

(2) When playing back particular music, using a template in which the timing of switching photographic images and fade-in and fade-out patterns are set to match the music.

Fade-in and fade-out in a slideshow are described in Japanese Unexamined Patent Publication No. 2006-166164, for example.

SUMMARY OF THE INVENTION

In the above method (1), the music progression information is used merely for playback control of a slideshow, and photographic images to be played back are independent of the music. Further, in the above method (2), available music is limited, and a user cannot use desired music.

In light of the foregoing, it is desirable to provide a novel and improved information processing apparatus, program, and information processing method that are capable of displaying images by making a correction corresponding to music to be played back.

According to an embodiment of the present invention, there is provided an information processing apparatus that includes a playback unit to play back music data, an analysis unit to analyze a feature of a relevant image of the music data, an image correction unit to perform image correction with use of any of a plurality of correction types, a storage unit to store one or more than one image, a selection unit to select a correction type corresponding to the feature of the relevant image analyzed by the analysis unit from the plurality of correction types, a correction control unit to cause the image correction unit to perform image correction of an image stored in the storage unit with use of the correction type selected by the selection unit, and an output unit to output the image corrected by the image correction unit.

The information processing apparatus may further include a creation unit to create a display screen including the image corrected by the image correction unit and the relevant image and being output from the output unit.

The correction control unit may change details of image correction by the image correction unit with use of the correction type selected by the selection unit with a lapse of time.

The correction control unit may further include a selection unit to select a target image of image correction by the image correction unit from one or more than one image stored in the storage unit according to a feature of the music data.

The information processing apparatus may further include a selection unit to select a target image of image correction by the image correction unit from one or more than one image stored in the storage unit according to a feature of the relevant image.

The information processing apparatus may further include a selection unit to select a target image of image correction by the image correction unit from one or more than one image stored in the storage unit according to additional information of the music data.

The analysis unit may further analyze a font of a character contained in the relevant image, and the display screen may further include additional information of the relevant image represented by a font identical or similar to the font analyzed by the analysis unit.

The display screen may further include additional information of the relevant image represented by a font corresponding to a feature of the music data.

According to another embodiment of the present invention, there is provided a program for causing a computer to function as an information processing apparatus that includes a playback unit to play back music data, an analysis unit to analyze a feature of a relevant image of the music data, an image correction unit to perform image correction with use of any of a plurality of correction types, a selection unit to select a correction type corresponding to the feature of the relevant image analyzed by the analysis unit from the plurality of correction types, a correction control unit to cause the image correction unit to correct one or more than one image stored in a storage medium with use of the correction type selected by the selection unit, and an output unit to output the image corrected by the image correction unit.

According to another embodiment of the present invention, there is provided an information processing method including the steps of playing back music data, analyzing a feature of a relevant image of the music data, selecting a correction type corresponding to the feature of the relevant image from a plurality of correction types, correcting one or more than one image stored in a storage medium with use of the selected correction type, and outputting the corrected image.

In the information processing apparatus, program, and information processing method according to the embodiments of the present invention described above, it is possible to display images by making a correction corresponding to music to be played back.

BRIEF DESCRIPTION OF THE DRAWINGS

FIG. 8 is an explanatory view showing a specific example of a motion pattern.

FIG. 9 is an explanatory view showing meaning of parameters representing motion patterns.

FIG. 16 is an explanatory view showing a noise added by a noise effector.

FIG. 33 is an explanatory view showing an example of the relationship of music mood and a font.

FIG. 35 is an explanatory view showing an example of the relationship of music genre and a font.

DETAILED DESCRIPTION OF THE EMBODIMENT

Figure 1:
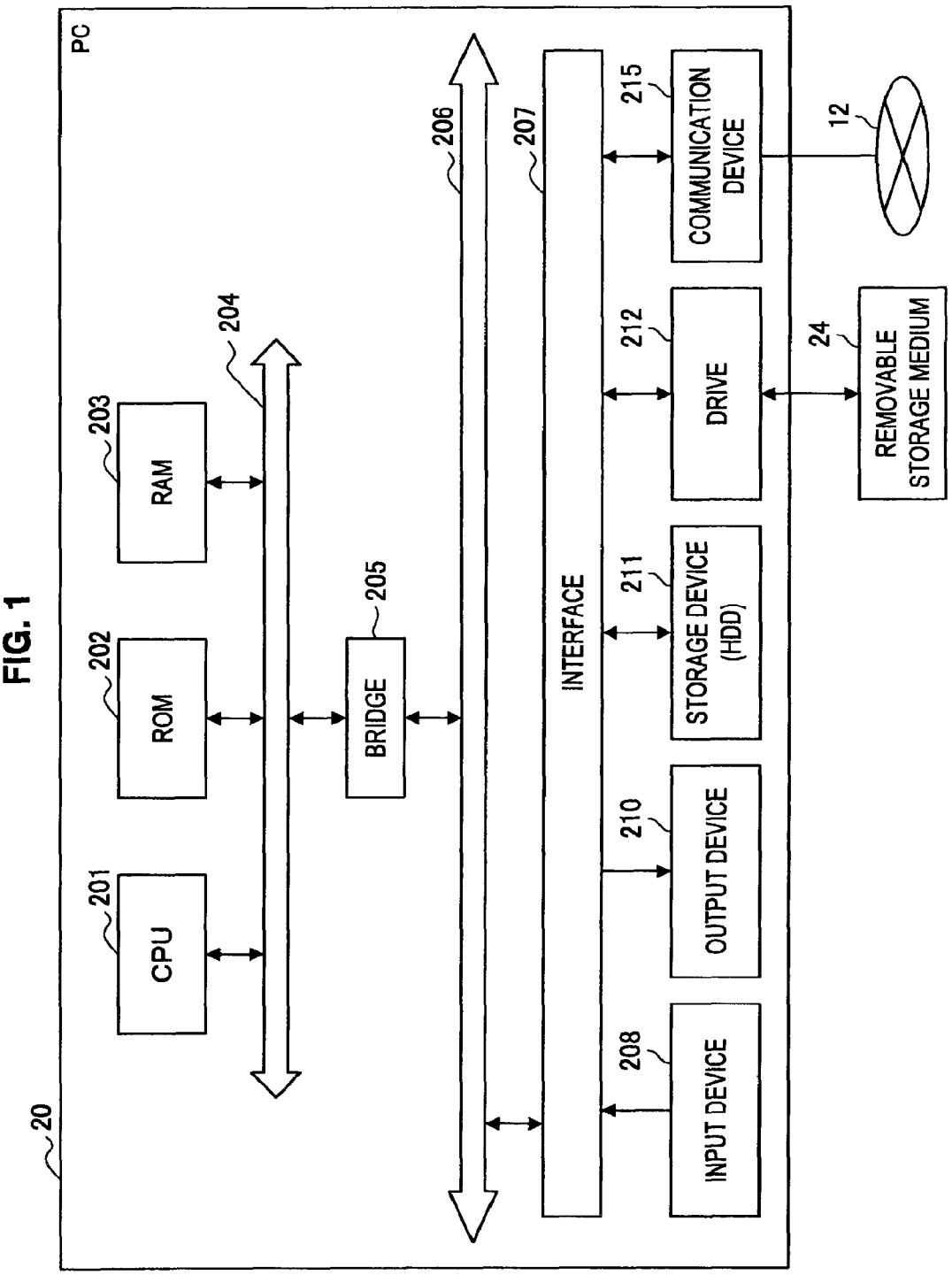
FIG. 1 is a block diagram showing a hardware configuration of a PC.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

An embodiment of the present invention will be described in the following order:
1. Hardware Configuration of PC
2. Outline of Function and Operation of PC
3. Setting of Playback Duration
4. Decision of Layout
5. Image Selection
6. Outline of Effect Processing
7. Parameter p
8. Explanation of Effect Types
[Monochrome]
[Noise]
[Posterization]
[Tone Effect]
[Color Imitation]
9. Selection of Effect Type
10. Execution of Slideshow
11. Summary and Supplementation <1. Hardware Configuration of PC>

A PC 20 according to an embodiment of the present invention can sequentially display photographic images on which an effect according to music data is performed along with playback of music data. Before describing the function of the PC 20 according to the embodiment, the hardware configuration of the PC 20 is described hereinafter with reference to FIG. 1.

FIG. 1 is a block diagram showing the hardware configuration of the PC 20. The PC 20 includes a CPU (Central Processing Unit) 201, ROM (Read Only Memory) 202, RAM (Random Access Memory) 203, a host bus 204, a bridge 205, an external bus 206, an interface 207, an input device 208, an output device 210, a storage device (HDD) 211, a drive 212, and a communication device 215.

The CPU 201 serves as a processing device and a control device, and it controls the overall operation in the PC 20 according to each program. The CPU 201 may be a microprocessor. The ROM 202 stores a program to be used by the CPU 201, a processing parameter and so on. The RAM 203 temporarily stores a program to be used in the execution on the CPU 201, a parameter that varies during the execution and so on. The CPU 201, the ROM 202 and the RAM 203 are connected with each other through the host bus 204, which may be a CPU bus or the like.

The host bus 204 is connected to the external bus 206 such as a PCI (Peripheral Component Interconnect/Interface) bus via the bridge 205. The host bus 204, the bridge 205 and the external bus 206 are not necessarily separated from each other, and their functions may be implemented on a single bus.

The input device 208 may include an input means for a user to input information, such as a mouse, a keyboard, a touch panel, a button, a microphone, a switch or a lever, and an input control circuit that generates an input signal based on a user input and outputs it to the CPU 201, for example. A user of the PC 20 manipulates the input device 208 to thereby input various data or direct processing operation to the PC 20.

The output device 210 may include a video output device such as a CRT (Cathode Ray Tube) display device, an LCD (Liquid Crystal Display) device, an OLED (Organic Light Emitting Display) device or a lamp, and an audio output device such as a speaker or a headphone, for example. The output device 210 may output reproduced contents, for example. Specifically, the video output device displays information such as reproduced photographic images. The audio output device converts reproduced music data or the like into a sound and outputs it.

The storage device 211 is a device for data storage that is configured as an example of a storage unit of the PC 20 according to this embodiment. The storage device 211 may include a storage medium, a recording device that records data onto the storage medium, a reading device that reads data from the storage medium, a deleting device that deletes data recorded on the storage medium and so on. The storage device 211 may be composed of an HDD (Hard Disc Drive), for example. The storage device 211 drives a hard disk and stores a program to be executed by the CPU 201 or various data. Music data, effect information and so on, which are described later, are recorded on the storage device 211.

The drive 212 is a reader/writer for a storage medium, and it may be built in the PC 20 or attached externally. The drive 212 reads information that is recorded on a removable storage medium 24 such as a magnetic disk, an optical disk, a magneto-optical disk or semiconductor memory which is attached thereto and outputs the information to the RAM 203.

The communication device 215 may be a communication interface that is composed of a communication device or the like for establishing connection with the communication network 12. The communication device 215 may be a communication device compatible with a wireless LAN (Local Area Network), a communication device compatible with a wireless USB, or a wire communication device that performs wired communication.

In this description, the PC 20 is described merely as an example of the information processing apparatus, and the information processing apparatus is not limited thereto. For example, the information processing apparatus may be a home video processing device (e.g. a DVD recorder, a videocassette recorder etc.), a cellular phone, a PHS (Personal Handyphone System), a portable music playback device, a portable video processing device or the like. Further, the information processing apparatus may be a PDA (Personal Digital Assistants), a home game machine, a portable game machine, an electrical household appliance or the like.

<2. Outline of Function and Operation of PC>

The function and the operation of the PC 20 according to the embodiment are schematically described hereinafter with reference to FIGS. 2 to 4.

Figure 2:
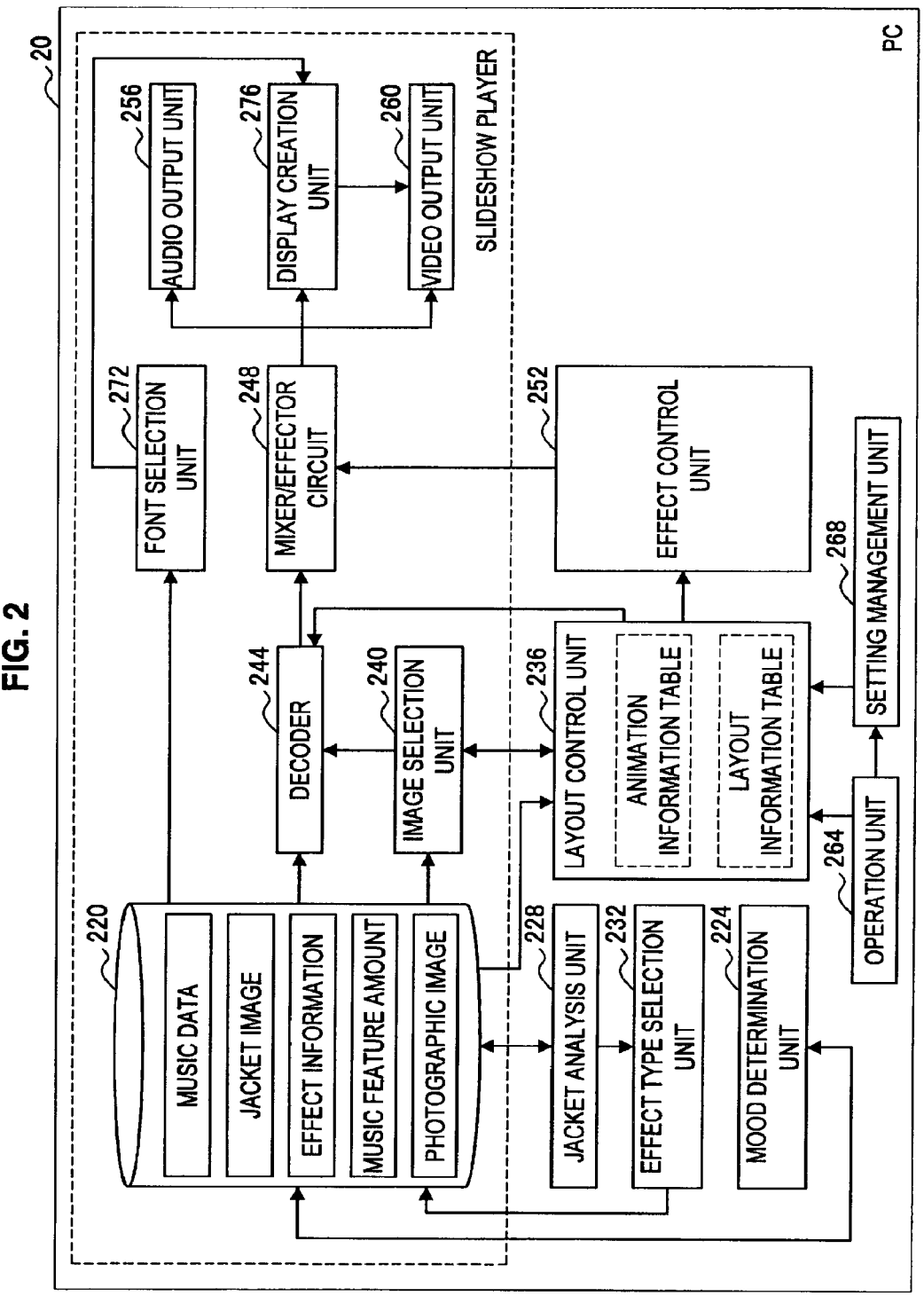
FIG. 2 is a functional block diagram showing a configuration of a PC according to an embodiment of the present invention.

FIG. 2 is a functional block diagram showing the configuration of the PC 20 according to the embodiment. Referring to FIG. 2, the PC 20 includes a slideshow player, a mood determination unit 224, a jacket analysis unit 228, an effect type selection unit 232, a layout control unit 236, an effect control unit 252, an operation unit 264 and a setting management unit 268. The slideshow player includes a storage unit 220, an image selection unit 240, a decoder 244, a mixer/effector circuit 248, an audio output unit 256, a video output unit 260, a font selection unit 272 and a display creation unit 276.

The storage unit 220 is a storage medium for storing music data, a jacket image, effect information, a music feature amount, a photographic image and so on which are used for execution of a slideshow.

Each music corresponds to any jacket image and is stored in the storage unit 220 in association with music data, for example. The music data and the jacket image may be acquired from an optical disc or may be acquired from a content distribution server through the communication network 12.

The music feature amount indicates features of music data, and it is acquired by analyzing music data. For example, the music feature amount may be a mood feature amount, music composition information, music progression information, mood and so on. Each of the music feature amount is described hereinafter.

(Mood Feature Amount)

The mood feature amount is obtained by converting impression, atmosphere or feeling of music such as "cheerful", "happy", "sad" and "refreshing" into numbers. The mood feature amount, which is a higher-order feature amount, can be extracted by extracting a basic feature amount (e.g. tempo, music progression information described below, etc.) through signal processing (sound analysis) of music data and then conducting machine learning and sound estimation using the basic feature amount. More specific analysis methods are disclosed in Japanese Unexamined Patent Publications Nos. 2005-274708, 2005-275068, 2008-27538, 2008-65905 and so on, for example.

(Music Composition Information)

The music composition information is information indicating the timing when starting components of music such as verse, bridge, chorus and ending relative to the head of the music. Referring to FIG. 3, the music composition information is described more specifically.

Figure 3:
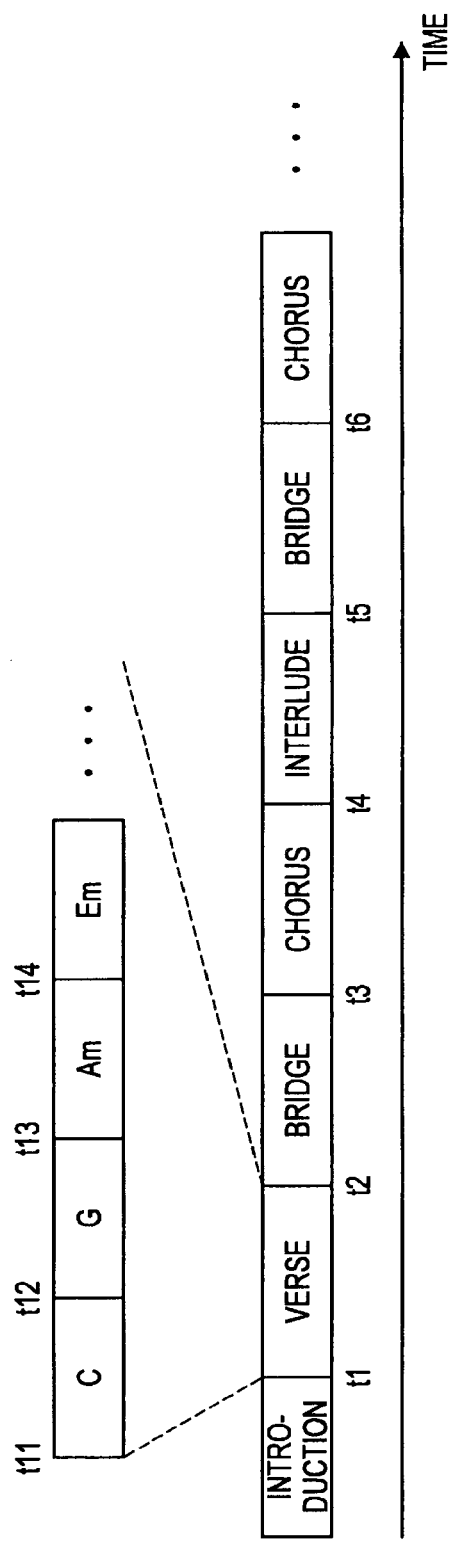
FIG. 3 is an explanatory view showing an example of a music composition.

FIG. 3 is an explanatory view showing an example of a music composition. FIG. 3 shows a case where components are arranged in the sequence of introduction, verse, bridge, chorus, interlude, bridge, chorus and so on. In this case, time t1 at which introduction switches into verse, time t2 at which verse switches into bridge, time t3 at which bridge switches into chorus, and, in the same manner, time t4 to t6, are the music composition information.

In this specification, the most impressive part of music is referred to as chorus. Because a method of analyzing music composition information is disclosed in Japanese Unexamined Patent Publication No. 2007-156434, for example, detailed explanation is omitted in this specification.

(Music Progression Information)

The music progression information is information indicating the timing when reaching each beat, measure and chord (C major, A minor etc.) during music relative to the head of the music. For example, in the case shown in FIG. 3, time t11 at which switching into C chord occurs, time t12 at which switching into G chord occurs, time t13 at which switching into Am chord occurs, time t14 at which switching into Em chord occurs, and so on are the music composition information. Because a method of analyzing music progression information is disclosed in Japanese Unexamined Patent Publication No. 2007-183417, for example, detailed explanation is omitted in this specification.

(Mood)

The mood of music is determined by the mood determination unit 224 based on the mood feature amount. The mood determination unit 224 may perform mood determination with use of the algorism of "automatic selection channel" used in PlayStation3 (registered trademark), for example. Further, the mood of music may represent the atmosphere of music, an abstract theme (climate, place, season, feeling, event etc.) recalled by music and so on. The following description is based on the assumption that the mood determination unit 224 determines the mood of music as any one of Energetic, Relaxing, Dramatic, Happy and Electronic. If music corresponds to a plurality of moods, the mood determination unit 224 may select one mood according to a given priority. A higher priority may be given to the mood to which music is not statistically likely to correspond, and the lowest priority may be given to Dramatic, and the higher priority may be given to Relaxing, Energetic, Electronic and Happy in this order.

The effect information includes image analysis information that is acquired by analysis of a jacket image by the jacket analysis unit 228, and an effect type that is selected by the effect type selection unit 232. Elements of the image analysis information and an example of the significance of each element in this specification are described hereinafter.

Average color: a value obtained by averaging colors of all pixels in a jacket image.

Contrast: a standard deviation of luminance values of all pixels in a jacket image.

Characteristic value, Characteristic vector: a characteristic value and a characteristic vector obtained by principal component analysis of a set of plotting all pixels in a jacket image on a 3D color space (which is an RGB space in this embodiment), arranged in the sequence of the first principal component, the second principal component and the third principal component. The characteristic value and the characteristic vector of the first principal component are respectively referred to as the first characteristic value and the first characteristic vector, the characteristic value and the characteristic vector of the second principal component are respectively referred to as the second characteristic value and the second characteristic vector, and the characteristic value and the characteristic vector of the third principal component are respectively referred to as the third characteristic value and the third characteristic vector. Specifically, as a result of principal component analysis of the set, three straight lines are obtained in the RGB space, and the longest, the second longest and the shortest lines of the three straight lines correspond to the first principal component, the second principal component and the third principal component, respectively. The direction of each straight line corresponds to the characteristic vector, and the length of each straight line corresponds to the characteristic value. If a peculiar color in the jacket image is separable, the characteristic value and the characteristic vector can be obtained by excluding the peculiar color as a point color and performing principal component analysis of a set of colors from which the point color is excluded.

Color histogram: each color value and its content when colors of a jacket image are subtracted to a specified number of colors (which is 32 colors in this embodiment).

Luminance histogram: a result of converting a jacket image into a gray-scale image and creating a histogram of its pixel values (luminance values) with a specified number (which is 32 colors at maximum in this embodiment).

Face information: information detected from a jacket image by facial recognition technology, which includes the number of faces contained in the jacket image, the position, size or tilt of each face and so on, for example.

Point color: a peculiar color among colors constituting a jacket image. In a jacket image containing a red object only in a part of a monochrome background, for example, the point color is a red color value of the object.

Font: a font and a character color of a character contained in a jacket image.

A specific example of the effect type (correction type) is described hereinbelow. The following description is based on the assumption that a photographic image selected from the storage unit 220 is an input image.

Monochrome: processing a photographic image in such a way that it is composed only of colors represented by a linear sum of two colors. An example is a so-called gray image (a linear sum of white and black). In this embodiment, appropriate colors as the two colors are decided based on the image analysis information of a jacket image.

Noise: after performing the same processing as the monochrome on a photographic image, adding a noise and further enhancing a contrast. The degree of monochrome effect execution and contrast enhancement is decided based on the image analysis information of a jacket image.

Posterization: representing a photographic image by a small number of colors (e.g. three colors). The colors to be used are decided based on the image analysis information of a jacket image.

Tone effect: shifting a color distribution of a jacket image as a whole in the direction corresponding to the image analysis information of a jacket image.

Color imitation: processing a color distribution of a jacket image so as to enhance a color component contained in a jacket image.

Because the image analysis information of a jacket image is used in the execution of each effect processing as described above, the atmosphere of the jacket image is reflected to no small extent on the photographic image on which the effect processing is performed. Further, in this embodiment, in order to allow the atmosphere of the photographic image on which the effect processing is performed to better match the atmosphere of the jacket image, the effect type selection unit 232 selects the effect type appropriate for the jacket image. As described in detail later in <9. Selection of Effect Type>, the effect type selection unit 232 selects monochrome for the jacket image that is a gray image, and selects posterization for the jacket image that is represented by a significantly smaller number of colors than the maximum number of colors.

A photographic image stored in the storage unit 220 can be selected as a display target during the execution of a slideshow. The PC 20 may acquire the photographic image from an imaging apparatus, for example, or through the communication network 12. An image that can be selected as a display target during the execution of a slideshow is not limited to a photographic image, and it may be an arbitrary image.

The storage unit 220 for storing music data, a jacket image, effect information, a music feature amount and a photographic image described above may be a storage medium such as nonvolatile memory, a magnetic disk, an optical disk or a MO (Magneto Optical) disk. Examples of the nonvolatile memory are EEPROM (Electrically Erasable Programmable Read-Only Memory), EPROM (Erasable Programmable Read-Only Memory) and so on. Examples of the magnetic disks are a hard disk, a discoid magnetic disk and so on. Examples of the optical disk are CD (Compact Disc), DVD-R (Digital Versatile Disk Recordable), BD (Blu-ray Disc (registered trademark)) and so on. The music data, the jacket image, the effect information, the music feature amount, the photographic image and so on may be stored in physically different storage media.

The layout control unit 236 sets a music playback duration during slideshow execution, refers to a layout information table and separates the playback duration into a plurality of image display frames (i.e. decides a layout). The layout information table contains information about a plurality of methods for separating the playback duration into a plurality of image display frames, and the layout control unit 236 decides the layout based on any of those methods. A different image is displayed in each image display frame.

Further, the layout control unit 236 has an animation information table that contains a plurality of motion patterns of images, and it selects a motion pattern of an image to be displayed in each image display frame from the animation information table.

The image selection unit 240 selects the necessary number of photographic images for execution of a slideshow from the storage unit 220 according to a result of deciding the layout by the layout control unit 236. A method of selecting photographic images is described in detail later in <5. Image Selection>.

The decoder 244 decodes music data stored in the storage unit 220 and photographic images selected by the image selection unit 240. For example, the decoder 244 decodes music data in MP3 (MPEG1 Audio Layer-3) format or ATRAC (Adaptive TRansform Acoustic Coding) format into PCM format.

The mixer/effector circuit 248 functions as an image correction unit that performs given processing on the music data and the photographic images decoded by the decoder 244. For example, the mixer/effector circuit 248 performs animation processing that is set by the layout control unit 236 or performs effect processing based on control of the effect control unit 252 on the photographic images decoded by the decoder 244. The mixer/effector circuit 248 according to the embodiment can function as a monochrome effector, a noise effector, a posterization effector, a tone effector, or a color imitation effector.

The effect control unit 252 functions as a correction control unit that controls the effect on a photographic image by the mixer/effector circuit 248. For example, the effect control unit 252 controls the effect type, the details of the effect processing, a parameter p, which is described later, and so on.

The audio output unit 256 converts the music data supplied from the mixer/effector circuit 248 into aerial vibration, for example, and outputs a result. Thus, the decoder 244, the mixer/effector circuit 248 and the audio output unit 256 function as a playback unit that plays back music data in collaboration with one another. The audio output unit 256 may supply the music data supplied from the mixer/effector circuit 248 to an external device.

The video output unit 260 functions as an output unit that displays the photographic image after effect processing which is supplied from the mixer/effector circuit 248 so as to be visible to a user. The video output unit 260 may output the photographic image after effect processing supplied from the mixer/effector circuit 248 to an external device.

The operation unit 264 is a user interface to which various kinds of information and various kinds of instructions are input by a user. The setting management unit 268 makes various settings based on a user operation to the operation unit 264, for example. The various settings include setting of a playback duration, setting of a layout, setting of an effect, image selection and so on, which are described later. The font selection unit 272 and the display creation unit 276 are described later in <10. Execution of Slideshow>.

A series of processing steps to create a slideshow with music by the PC 20 according to the embodiment is described hereinafter with reference to FIG. 4.

Figure 4:
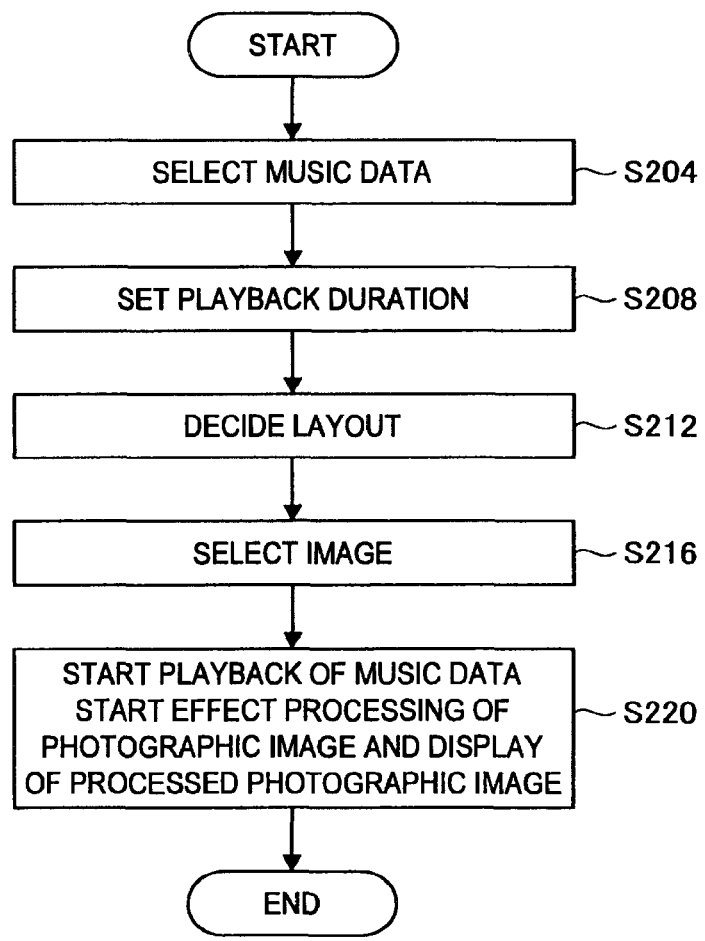
FIG. 4 is a flowchart showing a series of processing steps to create a slideshow with music.

FIG. 4 is a flowchart showing a series of processing steps to create a slideshow with music. As shown in FIG. 4, if music data to be played back is selected by a user through the operation unit 264 (S204), the layout control unit 236 sets a playback duration of the music data (S208). The playback duration may be a whole part of music or a highlight part of music, as described in detail later. Although FIG. 4 shows an example in which music data is selected by a user, the present embodiment is not limited thereto. For example, music data may be selected randomly or selected automatically from music data classified into specific mood.

Next, the layout control unit 236 separates the music playback duration into a plurality of image display frames (S212). The music playback duration may be separated by a fixed time, separated for each measure, separated according to a chord change, or separated automatically, as described in detail later. The layout control unit 236 may set a motion pattern to be applied to a displayed image for each image display frame.

Then, the image selection unit 240 selects the necessary number of photographic images for playback in the music playback duration (S216). After that, playback of the music data is started, and effect processing on the photographic image selected by the image selection unit 240 and decoded by the decoder 244 and display of the photographic image on which the effect processing is performed are started (S220).

The effect processing on the photographic image is performed as a result that the effect control unit 252 controls the mixer/effector circuit 248 based on effect information corresponding to a jacket image of music data to be played back. Consequently, according to the embodiment, it is possible to display the photographic image on which the effect processing is performed so as to match the atmosphere of the jacket image of the music data to be played back in the slideshow with music. Each processing in the present embodiment is described specifically hereinbelow.

<3. Setting of Playback Duration>

The playback duration of music data is selectable from a whole part of music data (full playback) or a highlight part of music data (digest playback). Which of the whole part of music data or the highlight part of music data is selected as the playback duration may be selected by a user through the operation unit 264 or preset to the PC 20. The highlight part of music data may be set by performing the processing shown in FIG. 5, for example, by the layout control unit 236.

Figure 5:
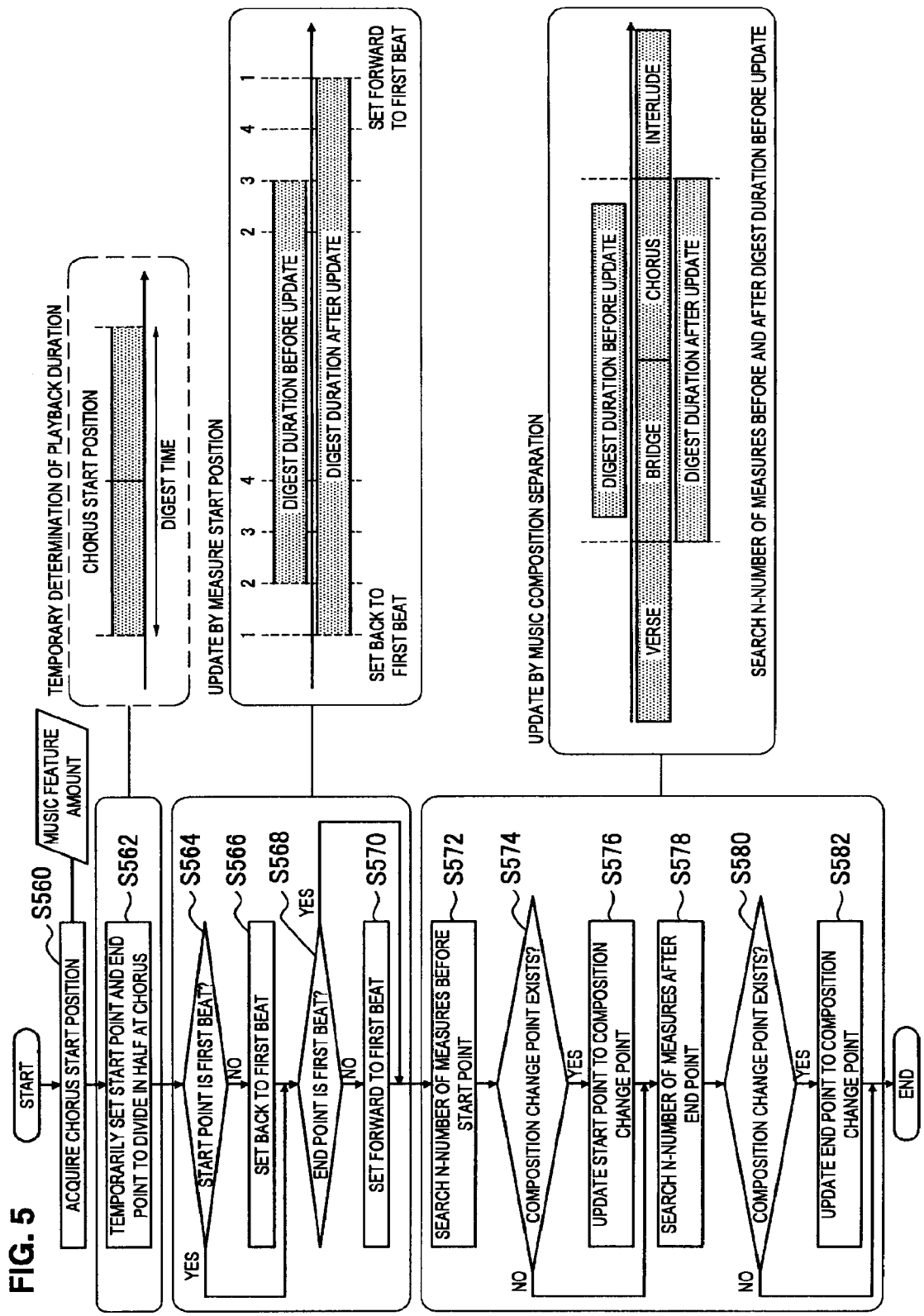
FIG. 5 is a flowchart showing the flow of processing to set a highlight part of music data by a layout control unit.

FIG. 5 is a flowchart showing a flow of processing to set a highlight part of music data by the layout control unit 236.

As shown in FIG. 5, the layout control unit 236 first acquires a chorus start position based on music composition information (which is included in the music feature amount) that is stored in the storage unit 220 (S560). Then, the layout control unit 236 temporarily sets a start point and an end point in such a way that a digest time is divided in half at the chorus start position as shown in the upper right part of FIG. 5 (S562).

Then, if the temporarily set start point is not the first beat (S564), the layout control unit 236 sets the start point back to the first beat (S566) and, if the temporarily set end point is not the first beat (S568), it sets the end point forward to the first beat (S570). The middle right part of FIG. 5 shows an example in which the start point is set back to the first beat because the temporarily set start point is the second beat, and the end point is set forward to the first beat because the temporarily set end point is the third beat.

Further, the layout control unit 236 searches the N-number (N≥1, e.g. N=4) of measures before the start point (S572), and if a composition change point at which the component of music changes exists (S574), updates the start point to the composition change point (S576). Likewise, the layout control unit 236 searches the N-number (N≥1, e.g. N=4) of measures after the end point (S578), and if a composition change point at which the component of music changes exists (S580), updates the end point to the composition change point (S582). The lower right part of FIG. 5 shows an example in which the start point is updated to the composition change point because the composition change point from verse to bridge exists during N-number of measures before the start point prior to update, and the end point is updated to the composition change point because the composition change point from chorus to interlude exists during N-number of measures after the end point prior to update.

In this manner, the duration from the start point to the end point obtained by the layout control unit 236 is set as the playback duration of digest playback (highlight part). Although the case where the period of N-number of measures before the start point is searched in S572 is illustrated in FIG. 5, the present embodiment is not limited thereto. For example, the layout control unit 236 may include the N-number of measures after the start point as a search target period. Likewise, although the case where the period of N-number of measures after the end point is searched in S578 is illustrated, the present embodiment is not limited thereto. For example, the layout control unit 236 may include the N-number of measures before the end point as a search target period.

<4. Decision of Layout>

The layout control unit 236 separates the set playback duration of music data into a plurality of image display frames by the following method, for example.

Time Fixation

This is a layout method that separates the playback duration of music data so as to switch images at regular time intervals, such as ten seconds, for example. In this method, the music feature amount is not particularly used.

Measure Separation

This is a layout method that separates the playback duration of music data so as to switch images every certain number of measures. The layout control unit 236 can specify after how many milliseconds from the head of the playback duration images are to be switched based on the time when measures are switched, which is contained in the music progression information. Because the tune generally tends to change every four measures or eight measures in the music having four beats, the layout control unit 236 may separate the playback duration every four measures or every eight measures, for example.

Chord Separation

This is a layout method that separates the playback duration of music data so as to switch images in synchronization with a change in chord progression. The layout control unit 236 can specify after how many milliseconds from the head of the playback duration images are to be switched based on the time when chords are switched, which is contained in the music progression information. For example, when the chord changes from C major to A minor after 1000 miliseconds from the head of the playback duration, the layout control unit 236 may separate the playback duration after 1000 miliseconds from the head of the playback duration. Because the playback duration is separated at regular intervals in the case of time fixation and measure separation, images are periodically switched in a slideshow. On the other hand, because the playback duration is separated at irregular intervals (one measure, two measures, one measure and two beats etc.) in the case of chord separation, the image switching period in a slideshow is not constant, thus enabling creation of a slideshow better matching the music flow.

Automatic Layout According to Mood

This is a layout method that separates the playback duration of music data according to a rule corresponding to the mood of music. The mood of music is determined by the mood determination unit 224 based on the music feature amount. This is described hereinafter with reference to FIGS. 6 and 7.

Figure 6:
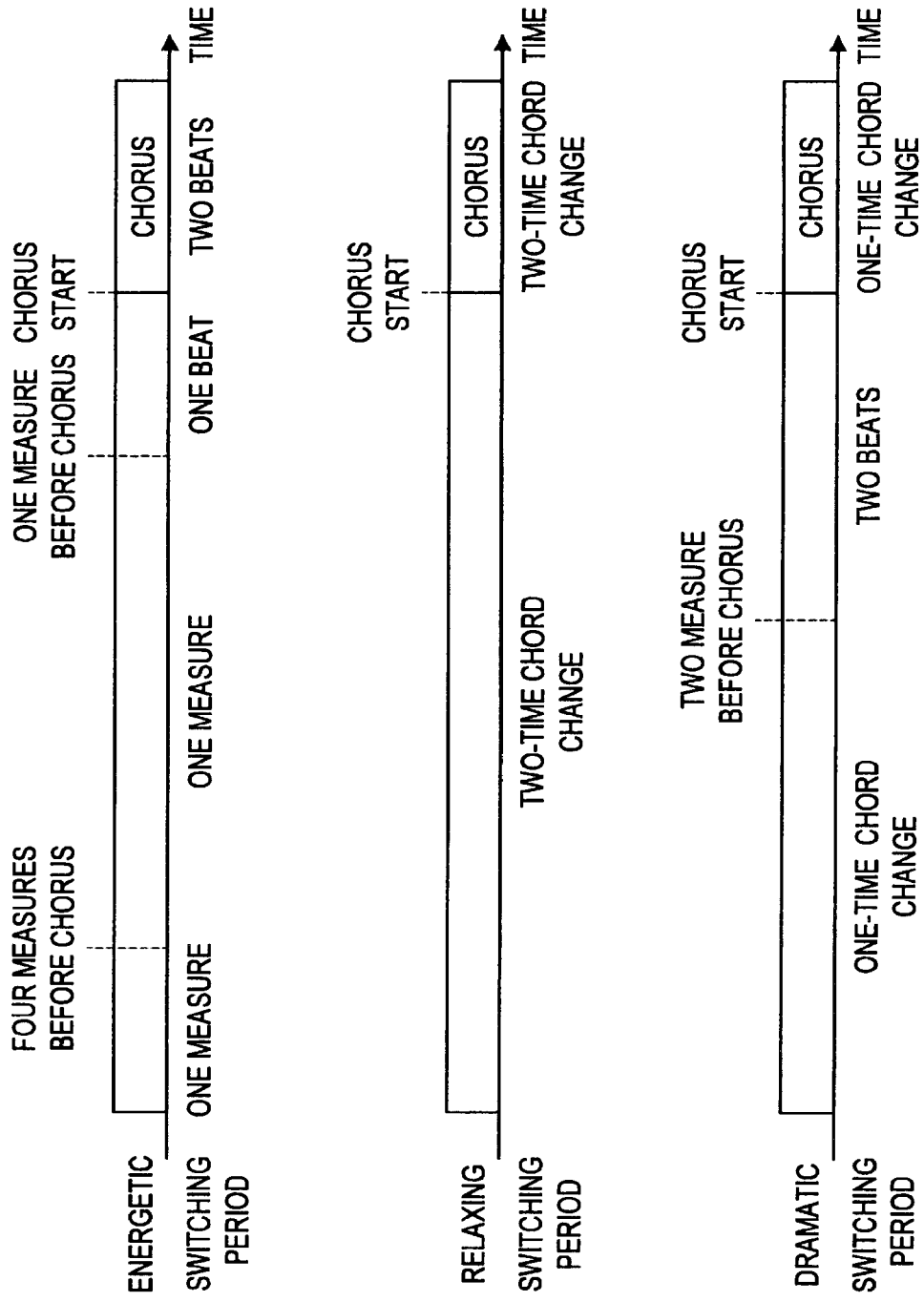
FIG. 6 is an explanatory view showing an example of setting of a layout according to mood.
Figure 7:
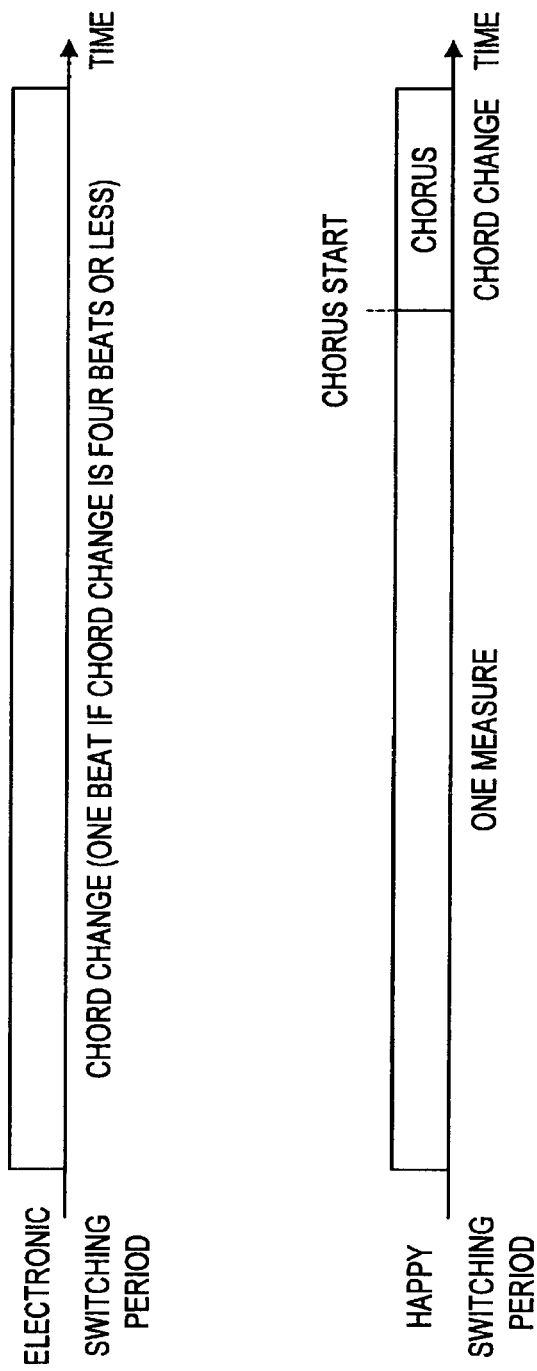
FIG. 7 is an explanatory view showing an example of setting of a layout according to mood.

FIGS. 6 and 7 are explanatory views showing an example of setting of a layout according to mood. The switching period shown in FIGS. 6 and 7 indicates the period when images are switched, which is, the period of the image display frame. As shown in FIG. 6, when the mood is Energetic, the playback duration is separated at the position of four measures before chorus, the position of one measure before chorus and the chorus start position. Then, the switching period is set to one measure until the position of one measure before chorus, set to one beat between the position of one measure before chorus and the chorus start position, and set to two beats after the chorus start position. Different motion patterns may be set to the respective playback durations.

Further, as shown in FIG. 6, in the case where the mood is Relaxing, the playback duration is set to two-time chord change. Furthermore, as shown in FIG. 6, in the case where the mood is Dramatic, the playback duration is set to one-time chord change until the position of two measures before chorus, set to two beats between the position of two measures before chorus to the chorus start position, and set to one-time chord change after the chorus start position. On the other hand, as shown in FIG. 7, in the case where the mood is Electronic, the photographic images are basically switched according to a chord change, and when a chord change is four beats or less, the photographic images are switched every beat. Further, as shown in FIG. 7, in the case where the mood is Happy, the switching period is set to one measure until the chorus start position, and set according to a chord change after the chorus start position.

As described above, by differentiating the switching period of photographic images with respect to the chorus start position, it is possible to create a slideshow which becomes more impressive (i.e. visual effects become significant) as the music playback position gets closer to chorus.

Further, after deciding the layout, the layout control unit 236 selects a motion pattern to be applied to an image to be displayed in each image display frame. The motion pattern is described hereinafter with reference to FIGS. 8 to 10.

Figure 10:
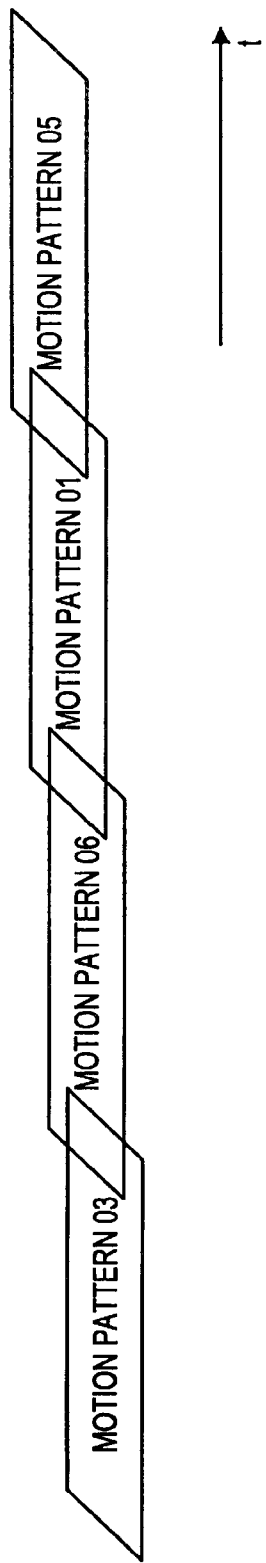
FIG. 10 is an explanatory view showing the relationship of a plurality of images upon switching.

FIG. 8 is an explanatory view showing a specific example of a motion pattern. FIG. 9 is an explanatory view showing meaning of parameters representing motion patterns. FIG. 10 is an explanatory view showing the relationship of a plurality of images upon switching. As shown in FIG. 8, each motion pattern has a plurality of parameters at a start point (at the start of an image display frame) and an end point (at the end of an image display frame). For example, FIG. 8 shows a position (X, Y, Z), a scale, X-rotation (an angle about the X-axis as a rotation axis shown in FIG. 9), Y-rotation (an angle about the Y-axis as a rotation axis shown in FIG. 9) and Z-rotation (an angle about the Z-axis as a rotation axis shown in FIG. 9) as parameters.

As an example, if a motion pattern 01 shown in FIG. 8 is selected in a certain image display frame, an image shifts from the position (452, 345, 489) to the position (262, 243, 1237) and rotates along the Y-axis from −28° to 33° in the image display frame. Further, as shown in FIG. 10, images may be switched in a cross-fading manner. Specifically, when images are switched, a next image may appear before a previous image disappears completely, so that two images are displayed in overlap with each other.

The layout control unit 236 may randomly select such a motion pattern in each image display frame. Alternatively, the layout control unit 236 may select or generate a motion pattern according to the mood of music to be played back or select or generate a motion pattern according to the contents of a photographic image to be displayed.

An example of the relationship between the mood of music to be played back and the motion pattern to be selected or generated is as follows.

| Mood of music: | Motion pattern: |
|---|---|
| Energetic | Pattern having large motion and quick motion |
| Relaxing | Pattern having small motion and slow motion |
| Electronic | Pattern having linear motion |

Further, an example of the relationship between the contents of a photographic image to be displayed and the motion pattern to be selected or generated is as follows.

| Contents of photographic image: | Motion pattern: |
|---|---|
| Person contained | Pattern with zoom-in or zoom-out of face |
| Vertical shooting, Horizontal shooting | Set zoom and rotation in such a way that the end of a photograph is not outside a display region |

The layout control unit 236 selects the music playback duration, the layout and the motion pattern in each image display frame as described above and then decides the necessary number of photographic images for execution of a slideshow. Then, the image selection unit 240 selects the number of photographic images decided by the layout control unit 236 from the photographic images stored in the storage unit 220. The selection of photographic images by the image selection unit 240 is described hereinafter.

<5. Image Selection>

Because the effect corresponding to a jacket photograph is performed on a photographic image in this embodiment, it is possible to allow any photographic image to match the atmosphere of the jacket photograph of music data to be played back. Therefore, the image selection unit 240 can randomly select the number of photographic images decided by the layout control unit 236 from the photographic images stored in the storage unit 220. In this configuration, it is expected that the photographic images stored in the storage unit 220 appear at equal frequencies, thus offering an opportunity to present a user with a photographic image which the user does not usually select intentionally.

Alternatively, a selection method using an image feature amount of a photographic image as described below is also used.

For example, the image selection unit 240 may select a photographic image according to the feature (e.g. the mood) of music data to be played back. In this configuration, the photographic image that matches the music data to be played back is selected, and it is thus expected that the music data and the photographic image complement each other. An example of the relationship between the mood of music to be played back and the photographic image to be selected is as follows.

| Mood of music: | Photographic image to be selected: |
|---|---|
| Relaxing | Photographic image with a lot of green and blue |
| Happy | Photographic image with smile |
| Electronic | Photographic image not containing a person |

Further, the image selection unit 240 may select a photographic image according to the feature (e.g. the effect type selected by the effect type selection unit 232) of a jacket photograph of music data to be played back. In this configuration, the photographic image appropriate for the effect to be performed is selected, for example, and it is thus expected to improve the advantage brought by the effect. An example of the relationship between the effect type of a jacket image of music data to be played back and the photographic image to be selected is as follows.

| Effect type: | Photographic image to be selected: |
|---|---|
| Noise | Old photograph |
| Posterization | Photographic image not containing a person |
| Color imitation | Image having a tone close to a jacket image |

Furthermore, the image selection unit 240 may select a photographic image according to additional information (e.g. release date, music title, genre etc.) of music data to be played back. In this configuration, it is expected that the photographic image having some relevance to music data is selected. An example of the relationship between the additional information of music data to be played back and the photographic image to be selected is as follows.

| Additional information: | Photographic image to be selected: |
|---|---|
| Release date | Photographic image around the same time as release date |
| Music title | Photographic image having a keyword included in a music title |

In the case of selecting a photographic image by a non-random method as described above, it is assumed that a particular photographic image is selected at a high frequency and other photographic images are almost not selected. In order to suppress the unevenness of the frequency of selection, the image selection unit 240 may accumulate the past selection frequencies and preferentially select the photographic image with the lower past selection frequency. Further, each of the plurality of selection methods of a photographic image described above may be used by itself or in combination.

Further, there may be a case where the number of photographic images selected by the image selection unit 240 does not meet the necessary number of photographic images for execution of a slideshow decided by the layout control unit 236. In such a case, the layout control unit 236 may assign the same photographic image to a plurality of image display frames or may assign a part of a photographic image to an image display frame different from that of the photographic image. Specifically, when extracting a part of a photographic image, a partial image may be created by zooming into every face contained in the photographic image with use of the face position contained in the image feature amount.

<6. Outline of Effect Processing>

The outline of the flow for implementing the effect processing according to the embodiment is described hereinafter with reference to FIGS. 11 to 13. In the following, a jacket image is generalized and referred to as a reference image, and a photographic image is generalized and referred to as an input image.

Figure 11:
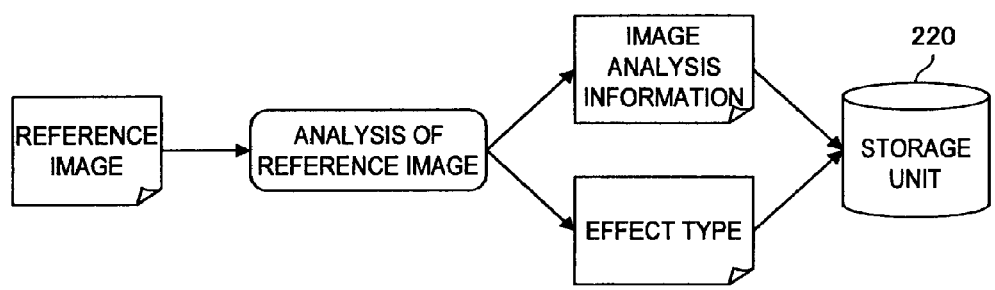
FIG. 11 is an explanatory view showing an example of acquisition of effect information.
Figure 12:
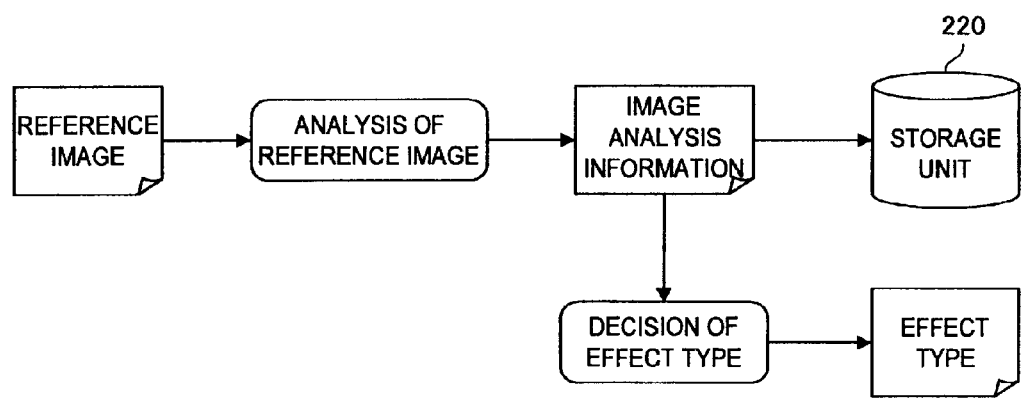
FIG. 12 is an explanatory view showing another example of acquisition of effect information.
Figure 13:
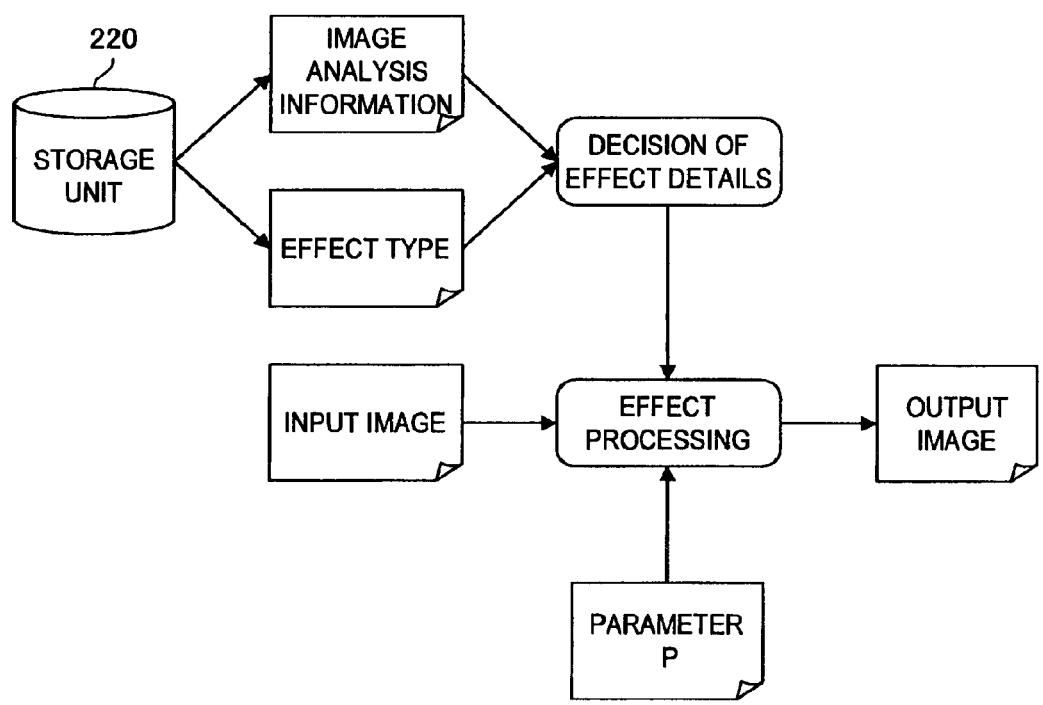
FIG. 13 is an explanatory view showing an example of execution of effect processing.

The effect processing according to the embodiment is implemented by performing image analysis of the reference image to thereby acquire the effect information such as the image analysis information and the effect type as shown in FIG. 11 or 12 and using the acquired effect information and a parameter p as shown in FIG. 13.

FIG. 11 is an explanatory view showing an example of acquisition of effect information. As shown in FIG. 11, image analysis of the reference image is performed firstly, thereby obtaining image analysis information and an optimum effect type of the reference image. Then, the effect information such as the image analysis information and the effect type are stored into the storage unit 220 in association with music data. For example, if the reference image is a jacket photograph, the effect information is stored into the storage unit 220 in association with music data corresponding to the jacket photograph.

Because the effect information is stored in the storage unit 220 in this manner, the image analysis of the reference image may be performed at timing different from the execution of a slideshow using the effect information. For example, the image analysis of the reference image may be performed when (before of after) the music data and the reference image are stored into the storage unit 220.

Although the case of directly analyzing the reference image and determining the effect type (which corresponds to the configuration shown in FIG. 2) is shown in FIG. 11, the present embodiment is not limited to such an example, as shown in FIG. 12.

FIG. 12 is an explanatory view showing another example of acquisition of effect information. As shown in FIG. 12, the image analysis information necessary for determination of the effect type may be acquired by the image analysis of the reference image, and the effect type may be determined based on the acquired image analysis information.

FIG. 13 is an explanatory view showing an example of execution of effect processing. As shown in FIG. 13, if music data to be played back is decided, the image analysis information and the effect type associated with the music data are acquired from the storage unit 220 in order to decide the details of the effect on an input image to be displayed along with playback of the music data.

Then, it is determined which of monochrome, noise, posterization, tone effect and color imitation is to be used according to the acquired effect type. Further, the details of the effect for producing the atmosphere like the reference image are decided by using the image analysis information of the reference image. The decision of the details of the effect is performed by the effect control unit 252 shown in FIG. 2.

After that, the effect processing on the input image is performed by the mixer/effector circuit 248 with the decided details of the effect. In this step, a parameter p that affects the details of the effect may be designated to the mixer/effector circuit 248. Therefore, by changing the parameter p according to playback of the music data, an output image changes, thereby producing a result similar to an animation. The parameter p is described hereinbelow.

<7. Parameter p>

The parameter p is a one-dimensional numerical value that affects the details of the effect performed by the mixer/effector circuit 248, which is a value between 0.0 and 1.0. Before describing an influence of the parameter p exerted on the processing details of each effect according to the embodiment, a change in the details of the effect caused by a change in the parameter p is described hereinafter by using a simple effect as an example.

Figure 14:
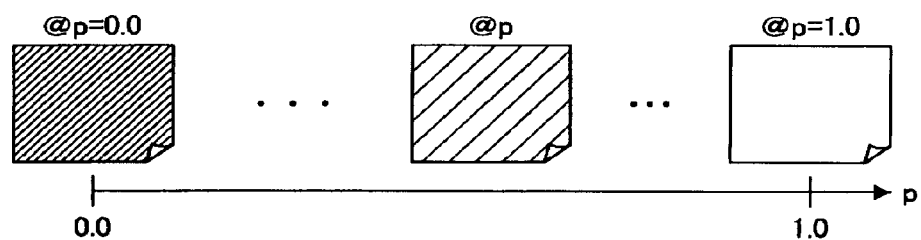
FIG. 14 is an explanatory view showing an influence of a parameter p on details of an effect.
Figure 15:
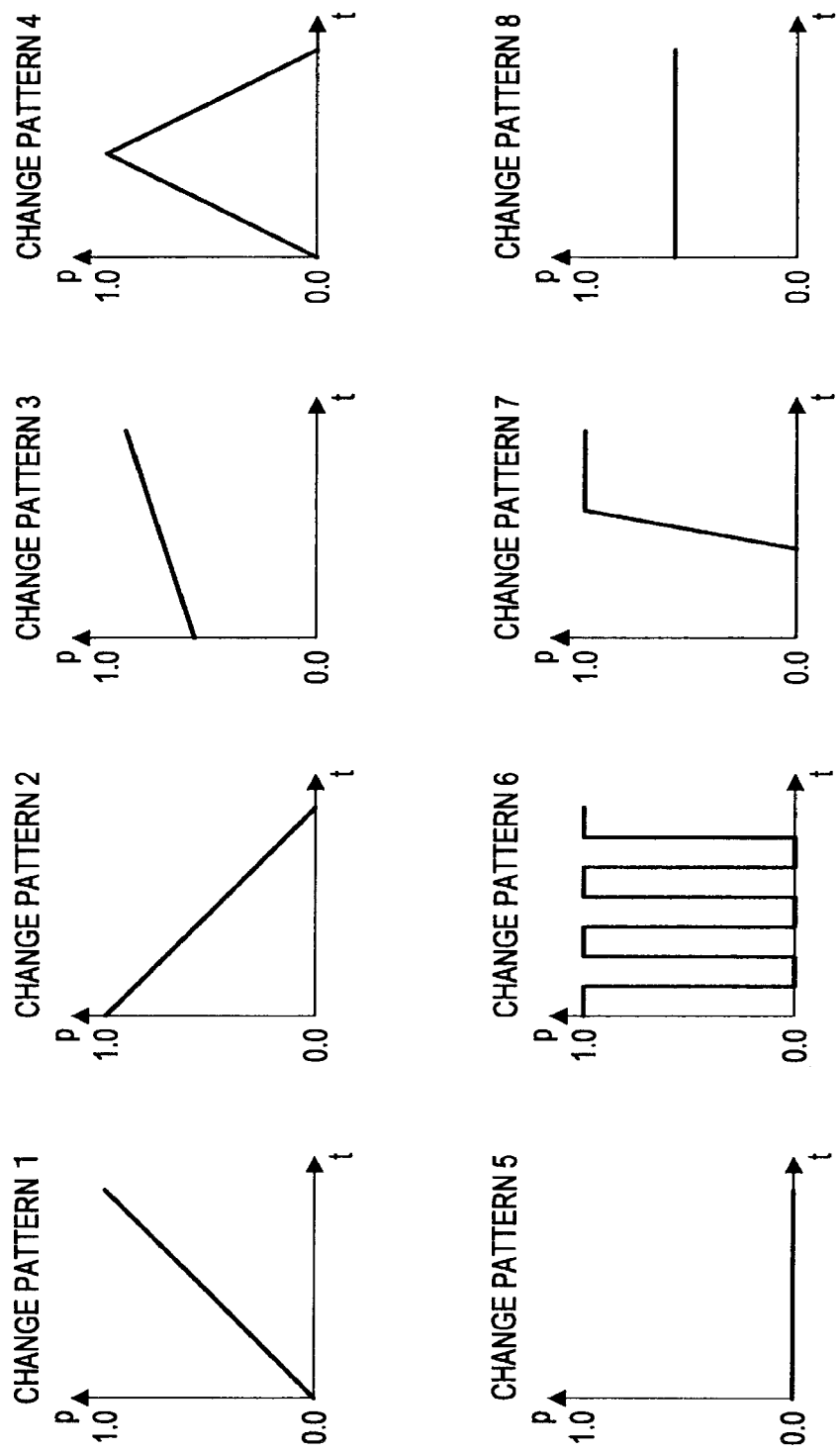
FIG. 15 is an explanatory view showing an example of the relationship between a lapse of time and a parameter p.

FIG. 14 is an explanatory view showing an influence of the parameter p on the details of an effect. Specifically, FIG. 14 shows a result of the effect processing that changes a photographic image into a single achromatic color image with respect to each value of the parameter p. As shown in FIG. 14, because the value of the parameter p exerts an influence on the details of the effect, a result of the effect processing varies depending on the value of the parameter p. Although FIG. 15 shows the case where the details of the effect are decided only by the parameter p for convenience of description, the details of the effect are affected not only by the parameter p but also by the image analysis information of the jacket image.

The parameter p exerts an influence related to the following items, for example, upon the details of each effect processing according to the embodiment.

Effect depth: a degree of effect processing to be performed on a photographic image. At the parameter p=0.0, there is no change in the photographic image before and after the effect processing, and at the parameter p=1.0, the highest degree of effect processing is performed on the photographic image. At 0.0<parameter p<1.0, the degree of effect processing corresponding to the value of the parameter p is performed on the photographic image.

Luminance: a degree of luminance change to be made on a photographic image. At the parameter p<0.5, processing to darken the photographic image according to the value of the parameter p is performed, and at the parameter p>0.5, processing to lighten the photographic image according to the value of the parameter p is performed.

Change in dependence on each effect: assigning the parameter p to a numerical value that exerts an influence on the details of processing in each effect. In this case, a change in the details of processing by the parameter p differs depending on effect processing.

Although an influence of the parameter p exerted on each effect processing is described in the following <8. Explanation of Effect Types>, the effect type and the influence of the parameter p may be independent of each other and used in combination. Further, each effect processing may be adjusted by a plurality of parameters pn such as parameters p1, p2, p3 and so on.

Further, in this embodiment, it is possible to obtain a photographic image that is represented like an animation by changing the value of the parameter p in association with playback time of music data. For example, the details of the effect can be changed with a lapse of time by setting the parameter p=0.0 at the start of display of a certain photographic image, increasing the value of the parameter p with the progress of playback of music data and setting the parameter p=1.0 at the switching to the next photographic image.

Although the case where the parameter p increases monotonely from 0.0 to 1.0 is described above, the present embodiment is not limited to such an example, as shown in FIG. 15.

FIG. 15 is an explanatory view showing an example of the relationship between a lapse of time and the parameter p. In FIG. 15, the change pattern 1 indicates the case where the parameter p increases monotonely from 0.0 to 1.0. Alternatively, as shown in the change pattern 2, the parameter p may decrease monotonely from 1.0 to 0.0. Further, as shown in the change pattern 3, the parameter p may increase monotonely from a first value (e.g. 0.5) to a second value (e.g. 0.8). Furthermore, as shown in the change pattern 4, the parameter p may increase monotonely from 0.0 to 1.0 and then decrease monotonely to 0.0.

As shown in the change pattern 5, the parameter p may be kept to 0.0. Further, as shown in the change pattern 6, the parameter p may be switched between 0.0 and 1.0. Furthermore, as shown in the change pattern 7, the parameter p may increase abruptly from 0.0 to 1.0 when a given length of time has passed from display of a certain image. Alternatively, as shown in the change pattern 8, the parameter p may be kept to a given value.

Further, the above change pattern that is used for effect processing may be set fixedly for each effect type or selected randomly from the plurality of change patterns for each image or music data.

Although a change in the parameter p during a display period of one photographic image is described above, the effect may be dependent on music itself by changing the parameter p according to the music feature amount. For example, if a luminance changes according to the parameter p, the parameter p may increase drastically as the playback position gets closer to chorus. Further, if a display period of a certain photographic image is long, the parameter p may repeatedly increase and decrease, the slope of change in the parameter p may be set to match tempo, or the parameter p may be switched between 0.0 and 1.0 in a part with intense tune, for example.

<8. Explanation of Effect Types>

Hereinafter, monochrome, noise, posterization, tone effect and color imitation, which are the effect types used in this embodiment, are described in detail with reference to FIGS. 16 to 19.

[Monochrome]

A monochrome effector processes a photographic image in such a way that it is composed only of colors represented by a linear sum of two colors. An image composed only of colors represented by a linear sum of two colors is a gray image, a sepia image or the like, for example. The monochrome effector uses information of the first characteristic vector in the RGB space and the average color which are contained in the image analysis information.

Specifically, because a straight line indicating the first characteristic vector in the RGB space passes through the average color of a jacket image, which is an intersection point with a straight line indicating another characteristic vector, a mathematical expression representing the straight line can be obtained from the first characteristic vector and the average color of the image. The monochrome effector performs processing of mapping the colors of all pixels in the photographic image onto a one-dimensional space indicated by the straight line based on the mathematical expression and setting a value at the mapped position as a new color of the pixel. The monochrome effector may not be particularly affected by the parameter p and output always the same result for the parameter p. Further, the monochrome effector may overlay a point color of a jacket image on the Gauss point at a given position of the photographic image and further change the given position according to the value of the parameter p.

[Noise]

A noise effector adds a noise after performing the same processing as the monochrome effector and further enhances a contrast after that. The noise effector uses information of the first characteristic vector, the average color and the contrast which are contained in the image analysis information of a jacket image. Specifically, the noise effector performs the same processing as the monochrome effector by using the information of the first characteristic vector and the average color and then performs contrast enhancement according to the contrast value.

There are the following three kinds of methods for adding a noise, for example, and the effect control unit 252 may randomly decide which of the three kinds of methods is to be used.

Point noise: increasing or decreasing several pixel values in a photographic image by a random value.

Grain noise: increasing or decreasing several pixel values in a photographic image by a random value, and also increasing or decreasing the surrounding pixel values. For example, if the pixel value of a pixel C is increased by x as shown in FIG. 16, the pixel values of pixels on the upper, lower, left and right sides of the pixel C are respectively increased by x/2, and the pixel values of pixels on the upper left, upper right, lower left and lower left of the pixel C are respectively increased by x/3.

Figure 17:
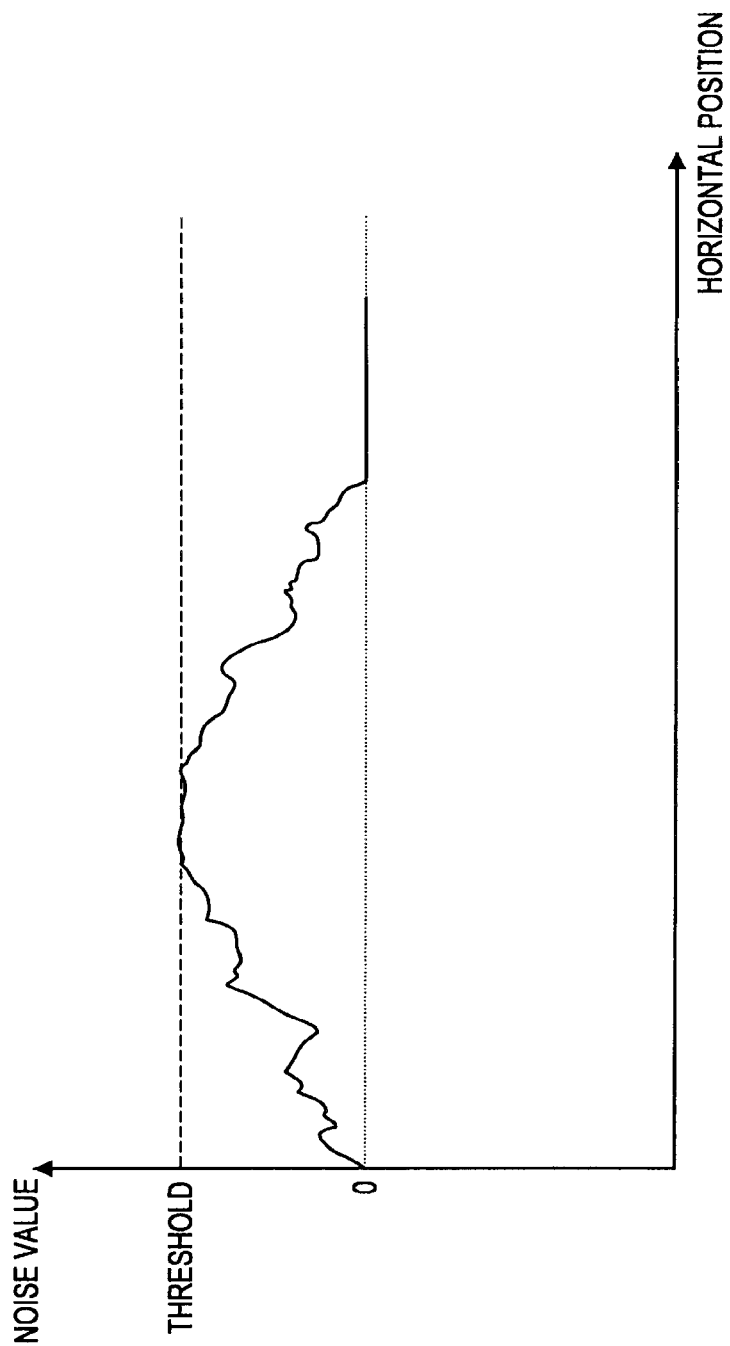
FIG. 17 is an explanatory view showing a noise added by a noise effector.

Scratch noise: setting several pixels in a photographic image to a noise start point. Then, setting a noise value at the noise start point to 0, repeatedly increasing and decreasing the noise value randomly as the pixel shifts one by one in the horizontal direction, and ending when the noise value becomes 0, as shown in FIG. 17. The absolute value of the noise value is controlled so as not to exceed a preset threshold. Further, the scratch noise can be added also in the vertical direction by setting a noise value at the noise start point to 0 and repeatedly increasing and decreasing the noise value randomly as the pixel shifts one by one in the vertical direction.

Further, the noise effector performs contrast enhancement according to the following Expression 1. In Expression 1, v indicates the original luminance value of a certain pixel in a photographic image, v' indicates the luminance value after contrast enhancement of the pixel, and m indicates the average luminance value of the photographic image. Further, the value of v satisfies $0.0 \leq v \leq 1.0$, and "contrast" is a value indicating a degree of contrast enhancement. The correspondence relationship between the value of "contrast"

and the contrast of a jacket image may be preset in such a way that the value of "contrast" is larger as the contrast of the jacket image is larger.

$$v' = m \times \left(\frac{v}{m}\right) \text{contrast} \qquad (v < m) \qquad \text{[Expression 1]}$$

$$v' = 1.0 - (1.0 - m) \times \left(\frac{1.0 - v}{1.0 - m}\right) \text{contrast} \quad (v \geq m)$$

Furthermore, the noise effector changes a random sequence that is used when adding a noise according to the parameter p. For example, the noise effector may prepare photographic images on which effect processing is performed with different random sequences in advance and switch a photographic image to output according to a change in the parameter p. Further, the noise effector may perform effect processing based on the parameter p that changes according to the change pattern 1 shown in FIG. 15, for example.

[Posterization]

A posterization effector represents a photographic image with a small number of colors such as two or three colors (three colors at maximum in this embodiment). The posterization effector first refers to information of the color histogram which is contained in the image analysis information of a jacket image and randomly selects three colors at maximum from the color histogram.

If there is one color having some content in the color histogram, the posterization effector may compare the color with white and black and further select the color with a larger distance in the color space. Further, if there are two colors having some content in the color histogram, the posterization effector may select the same color as a color 1 and a color 3. Furthermore, the effect control unit 252 may select a color having the maximum content in the color histogram and make a selection as a color 2.

The posterization effector has a threshold th1 and a threshold th2 (th1<th2) that splits the range of a luminance value in three. If three colors are selected by the effect control unit 252, the posterization effector assigns a color 1 to a pixel with a luminance value of equal to or smaller than the threshold th1 in the photographic image. Likewise, the posterization effector assigns a color 2 to a pixel with a luminance value of larger than the threshold th1 and equal to or smaller than the threshold th2 in the photographic image, and assigns a color 3 to a pixel with a luminance value of larger than the threshold th2 in the photographic image.

Further, the posterization effector assigns a color mixed according to the following Expression 2 to a pixel with a luminance value of near the threshold th1 or near the threshold th2. In Expression 2, col1 indicates the color 1, col2 indicates the color 2, col3 indicates the color 3, c indicates the original color value of a pixel, and c' indicates the color value of the pixel after color mixture. Further, "margin" indicates the range of a luminance value as a target of color mixture, which may be set in advance.

$$th1\_d = th1 - m \, arg \, in \qquad \text{[Expression 2]}$$

$$th1\_u = th1 + m \, arg \, in$$

$$th2\_d = th2 - m \, arg \, in$$

-continued $$th2\_u = th2 + m \, arg \, in$$

$$c' = col1 \qquad (c \leq th1\_d)$$

$$c' = \frac{((th1\_u - c) \times col1 + (c - th1\_d) \times col2)}{m \, arg \, in \times 2} \quad (th1\_d < c \leq th1\_u)$$

$$c' = col2 \qquad (th1\_u < c \leq th2\_d)$$

$$c' = \frac{((th2\_u - c) \times col2 + (c - th2\_d) \times col3)}{m \, arg \, in \times 2} \quad (th2\_d < c \leq th2\_u)$$

$$c' = col3 \qquad (th2\_u \leq c)$$

Figure 18:
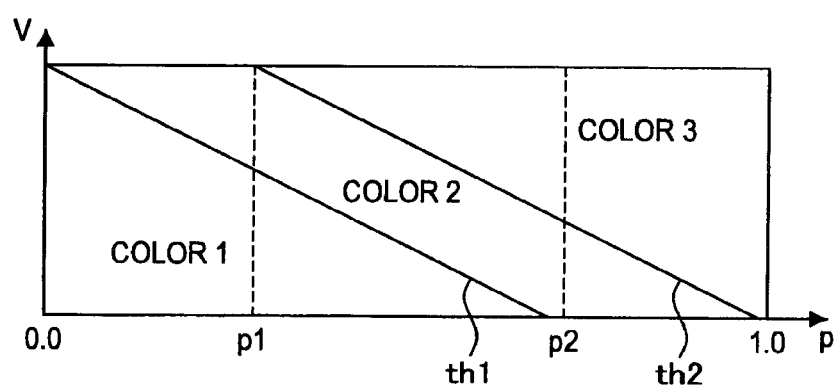
FIG. 18 is an explanatory view showing the relationship of a threshold th1 and a threshold th2 with a parameter p.

Further, the posterization effector changes the values of the threshold th1 and the threshold th2 according to the parameter p as shown in FIG. 18.

FIG. 18 is an explanatory view showing the relationship of the threshold th1 and the threshold th2 with the parameter p. As shown in FIG. 18, at the parameter p=0.0, the color 1 is assigned to all pixels in the photographic image, and as the parameter p increases, the color 2 is assigned to the pixels with a higher luminance value. Then, when the parameter p exceeds p1, the color 3 is assigned to the pixels with a luminance value of higher than the threshold th2, the color 1 is assigned to the pixels with a luminance value of equal to or lower than the threshold th1, and the color 2 is assigned to the other pixels, so that the photographic image is represented by three colors. Further, when the parameter p exceeds p2, the color 3 is assigned to the pixels with a luminance value of higher than the threshold th2, and the color 2 is assigned to the pixels with a luminance value of equal to or lower than the threshold th2, so that the photographic image is represented by two colors. Then, at the parameter p=1.0, the color 3 is assigned to all pixels in the photographic image.

In order to represent the photographic image always by three colors, the parameter p may be changed only between p1 and p2. Further, although the case where the threshold th1 and the threshold th2 are changed by the parameter p is described above, "margin" in Expression 2 may be changed by the parameter p. Further, the effect control unit 252 may supply the parameter p that changes according to the change pattern 1 or the change pattern 2 shown in FIG. 15 to the mixer/effector circuit 248.

[Tone Effect]

A tone effector shifts the color distribution of a photographic image as a whole in a certain direction by using information of the average color which is contained in the image analysis information of a jacket image. Specifically, the tone effector calculates the average color of the photographic image and obtains a difference vector diffvec by calculation of (average color of jacket image−average color of input image). When c is the color value of a certain pixel of a photographic image, c' is the color value of the pixel after effect processing, and g is the color value after gray conversion of the pixel, the color value c' of the pixel after effect processing can be calculated by the following Expression 3. Although Expression 3 cuts a chroma in half by dividing the sum of the color value c of a certain pixel and the color value g after gray conversion by two, a chroma may be reduced by another method.

$$c' = \frac{c + g}{2} + \text{diffvec} \qquad \text{[Expression 3]}$$

The tone effector changes a luminance according to the parameter p. For example, at the parameter p=0.5, the tone effector outputs a photographic image obtained by the processing using the above Expression 3. On the other hand, at the parameter p=0.0, the tone effector outputs a photographic image by reducing a luminance overall by a certain amount, and at the parameter p=1.0, the tone effector outputs a photographic image by increasing a luminance overall by a certain amount. Further, at 0<parameter p<0.5, the tone effector outputs a photographic image by reducing a luminance overall by the amount corresponding to the parameter p, and at 0.5<parameter p<1.0, the tone effector outputs a photographic image by increasing a luminance overall by the amount corresponding to the parameter p.

In practice, the tone effector may calculate photographic images to be output at the parameter p=0.0 and at the parameter p=1.0 in advance and obtain a desired photographic image by performing α-blending of the both photographic images according to the value of the parameter p. Further, the effect control unit 252 may supply the parameter p that changes according to the change pattern 1 shown in FIG. 15, for example, to the mixer/effector circuit 248.

[Color Imitation]

A color imitation effector performs processing of enhancing a color component contained in a jacket image in the color distribution of a photographic image. The color imitation effector uses information of the color histogram which is contained in the image analysis information.

The color imitation effector first converts the photographic image into a color space such as YUV space or L*a*b space where a luminance and a color difference component exist orthogonally. In the following, the case where the color imitation effector converts the photographic image into the YUV space is described. In this case, the color imitation effector also converts each color in the color histogram of the jacket image into representation on the YUV space.

Figure 19:
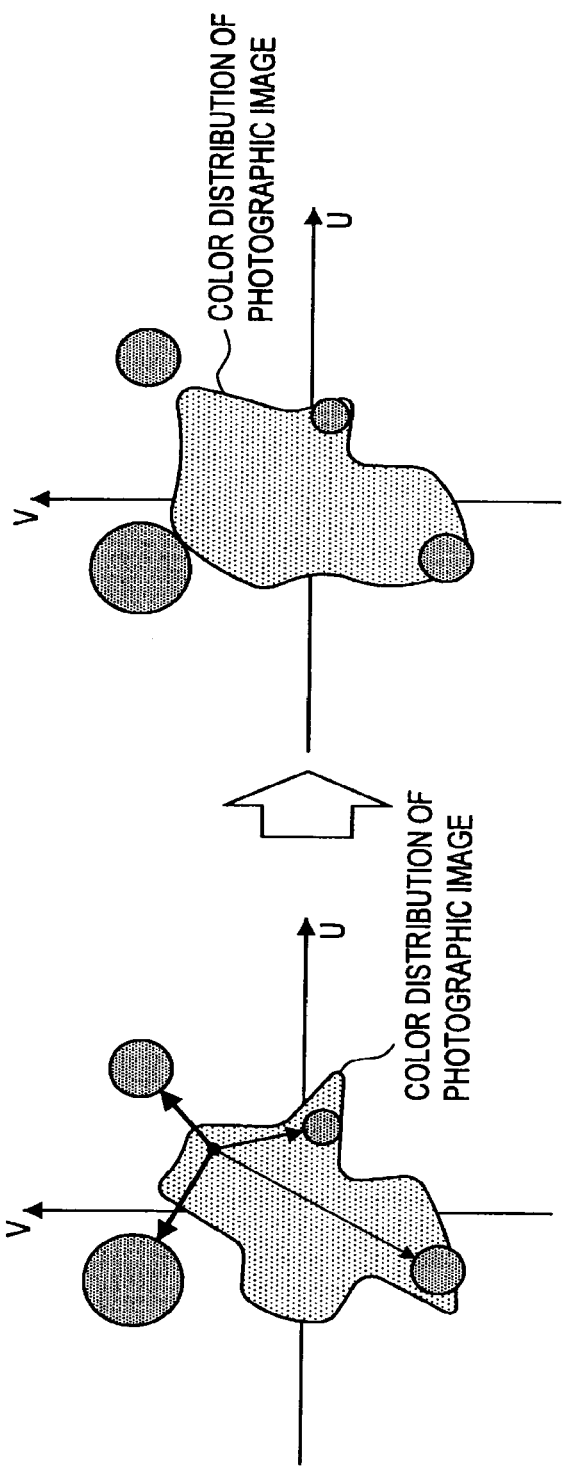
FIG. 19 is an image illustration of processing by a color imitation effector.

It is assumed that the color distribution of the photographic image and the color in the color histogram of the jacket image are projected on the UV plane as shown in the left part of FIG. 19. In FIG. 19, a circular region corresponds to the color in the color histogram of the jacket image, and the size of the circular region indicates a content. In this case, the color of each pixel of the photographic image is pulled by all colors in the color histogram projected on the UV plane by a strencth according to a content and a distance. Specifically, the color of each pixel of the photographic image is pulled more strongly as a distance to the color in the color histogram on the color space is shorter and more strongly as the content of the color is larger.

A weight "weight_uv(c_uv)" that each pixel is pulled by a color in a certain color histogram c_uv can be represented by the following Expression 4. In Expression 4, uv indicates the UV value of the original color of a certain pixel in a photographic image, and n indicates the content of a color in a color histogram.

$$dist(c\_uv) = |c\_uv - uv| \qquad \text{[Expression 4]}$$

$$weight\_uv(c\_uv) = \frac{n}{dist(c\_uv)^2 + 1}$$

Accordingly, the amount d_uv(c_uv) that each pixel is pulled can be represented by the following Expression 5.

$$d\_uv(c\_uv) = uv \times weight\_uv(c\_uv) \qquad \text{[Expression 5]}$$

Based on a result of conducting the calculation of Expression 5 on all colors in the color histogram, the UV value uv' of the pixel color after processing can be calculated by the following Expression 6.

$$d\_uv(c\_uv) = uv \times weight\_uv(c\_uv) \qquad \text{[Expression 5]}$$

The color imitation effector outputs the photographic image as it is at the parameter p=0.0, and outputs the photographic image obtained by the above Expression 6 at the parameter p=1.0. At 0.0<parameter p<1.0, the color imitation effector outputs the interim photographic image in the process of reaching the result at the parameter p=1.0.

In practice, the color imitation effector may calculate a photographic image to be output at the parameter p=1.0 in advance and obtain a desired photographic image by performing α-blending of the photographic image with a photographic image before processing according to the value of the parameter p.

Further, the effect control unit 252 may supply the parameter p that changes according to the change pattern 7 shown in FIG. 15, for example, to the mixer/effector circuit 248. Specifically if a display period of a certain photographic image is t, the parameter p may be 0.0 during 0.0≤t≤0.4, the parameter p increases monotonely from 0.0 to 1.0 during 0.4≤t≤0.6, and the parameter p may be 1.0 during 0.6≤t≤1.0. In this configuration, it is possible to produce representation in which an unprocessed photographic image is maintained for a while from the start of display, and then it abruptly changes into a processed photographic image at about t=0.5, which is a midpoint. Further, the luminance histogram of the photographic image may be adjusted in such a way that the luminance distribution of the photographic image matches the luminance histogram of the jacket image.

<9. Selection of Effect Type>

As described in the foregoing, the image analysis information of a jacket image is used in the execution of each effect processing, and therefore the atmosphere of the jacket image is reflected to no small extent on the photographic image on which the effect processing is performed. Further, in this embodiment, in order to allow the atmosphere of the photographic image on which the effect processing is performed to better match the atmosphere of the jacket image, the effect type selection unit 232 selects the effect type appropriate for the jacket image. The selection of the effect type for each jacket photograph by the effect type selection unit 232 is described hereinafter with reference to FIGS. 20 to 25.

Figure 20:
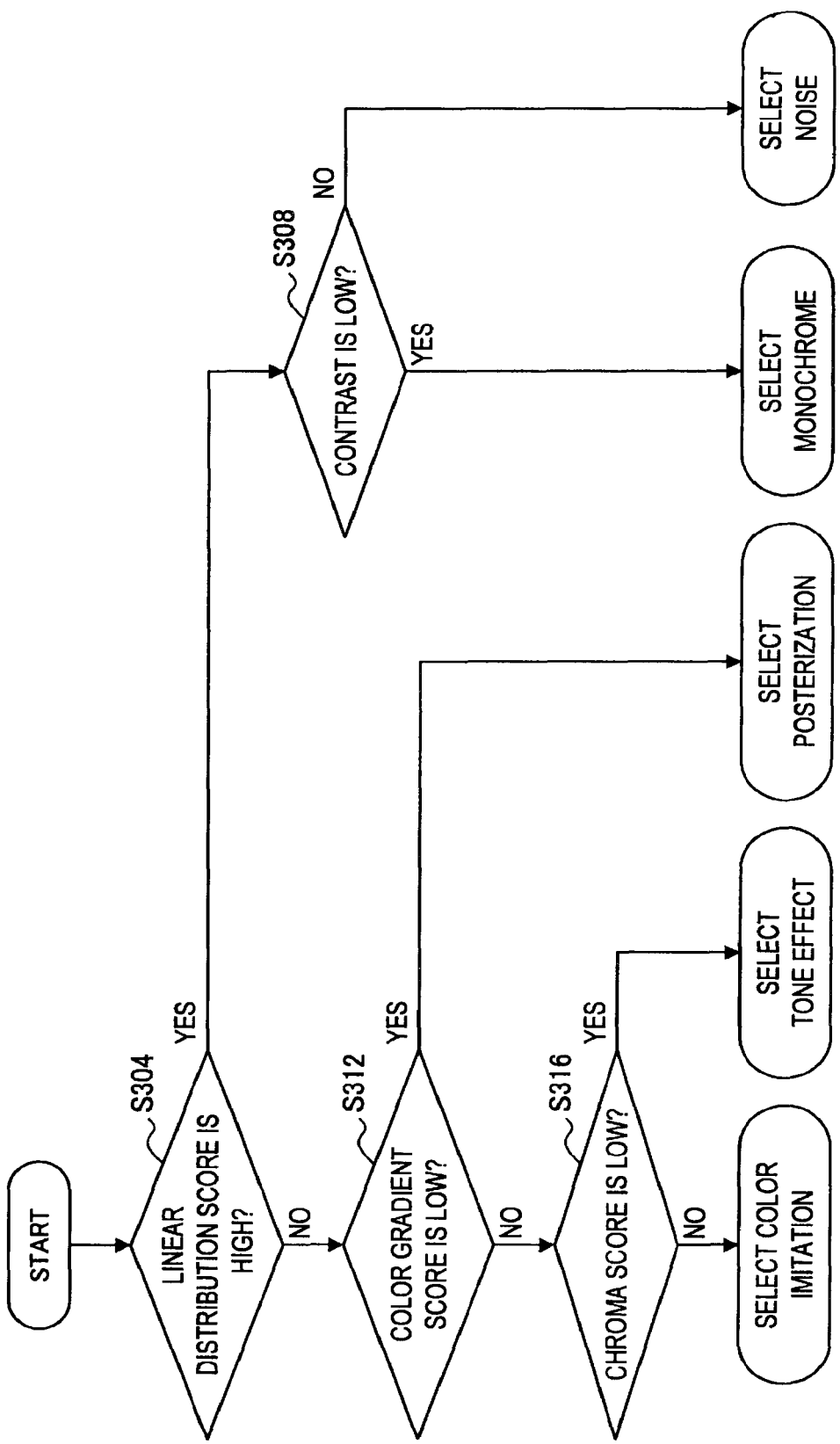
FIG. 20 is a flowchart showing the flow when an effect type selection unit selects an effect type of each jacket photograph.

FIG. 20 is a flowchart showing the flow when the effect type selection unit 232 selects the effect type of each jacket photograph. FIGS. 21 to 25 are explanatory views showing specific examples of jacket images A to E. Which effect type is to be selected for each of the jacket images A to E is described hereinafter with reference to the flowchart shown in FIG. 20.

Figure 21:
FIG. 21 is an explanatory view showing a specific example of a jacket image on which monochrome determination is made.
Figure 22:
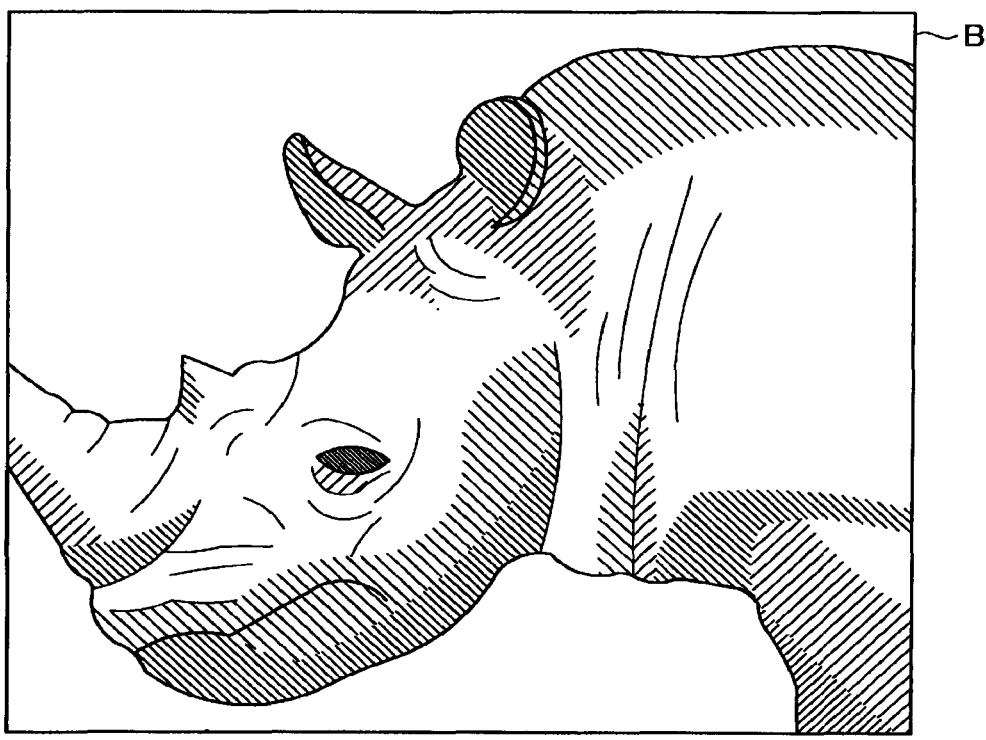
FIG. 22 is an explanatory view showing a specific example of a jacket image on which noise determination is made.
Figure 23:
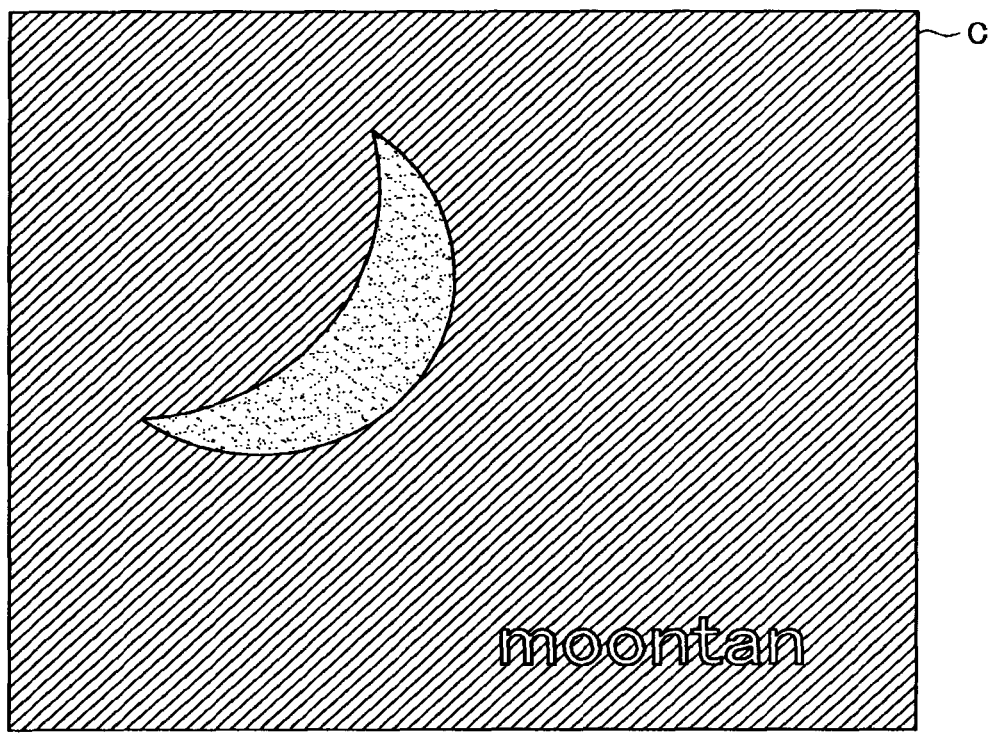
FIG. 23 is an explanatory view showing a specific example of a jacket image on which posterization determination is made.
Figure 24:
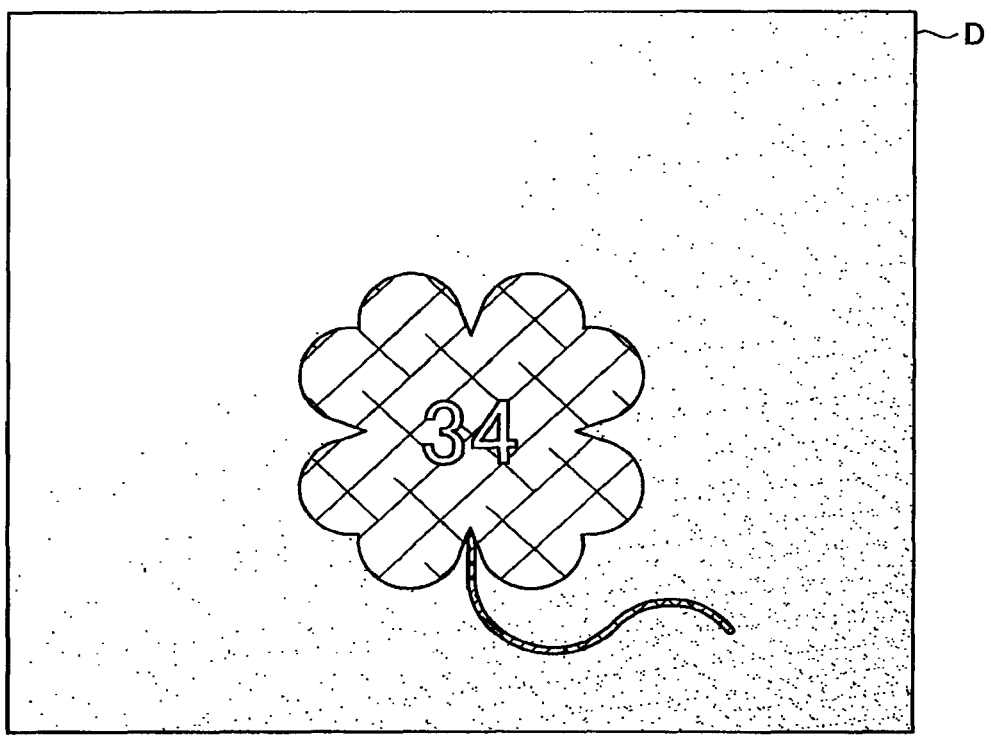
FIG. 24 is an explanatory view showing a specific example of a jacket image on which tone effect determination is made.
Figure 25:
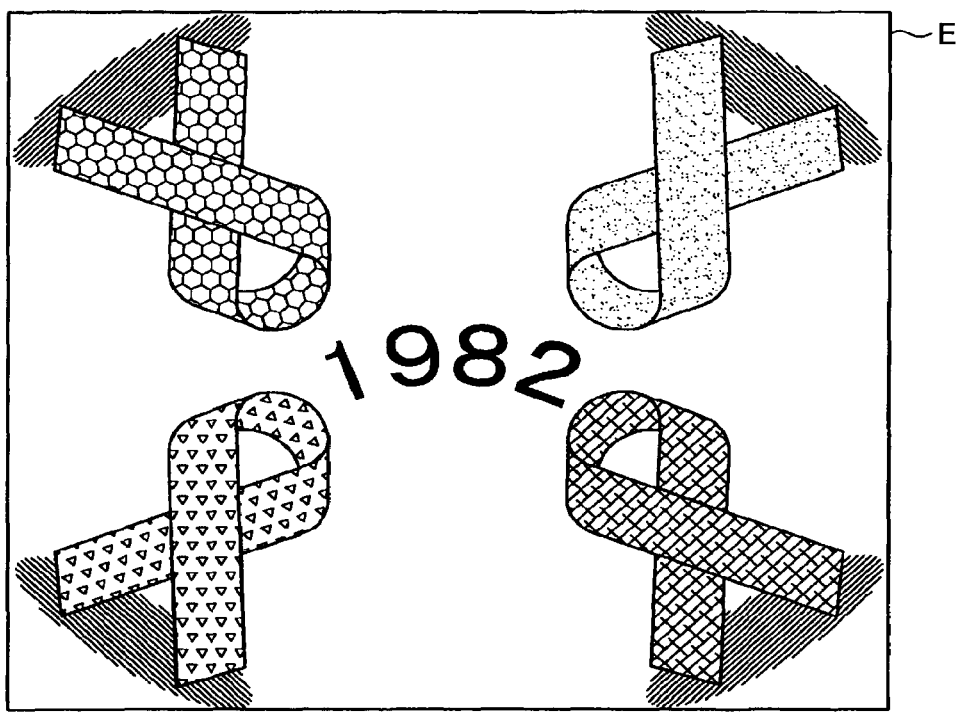
FIG. 25 is an explanatory view showing a specific example of a jacket image on which color imitation determination is made.

In FIGS. 21 to 25, a hue is represented by the kind of hatching, and a chroma or a luminance are represented by the density of hatching. For example, a jacket image A shown in FIG. 21 is composed of a background in black (oblique hatching) becoming lighter from the four corners to the center and a character "TANGIBLE" in black. A jacket image B shown in FIG. 22 is composed of a background in white and an image of a rhinoceros containing various mixed colors of white and black. A jacket image C shown in FIG. 23 is composed of a background in black, an image of the moon in yellow (scattered dot hatching) and a character "moontan" in white. A jacket image D shown in FIG. 24 is composed of a background with yellow chroma increasing from the upper left to the lower right and an image of a flower in green (oblique cross hatching). A jacket image E shown in FIG. 25 is composed of a background in white and a plurality of ribbons having various colors.

Referring to FIG. 20, the effect type selection unit 232 first determines whether a linear distribution score of a jacket image is higher than a prescribed value (S304). Because the linear distribution score is a value obtained by dividing the first characteristic value contained in the image analysis information by the second characteristic value, it becomes higher as the pixel value of the jacket image forms a more linear distribution in the color space. Thus, the effect type selection unit 232 determines that the linear distribution score of the jacket images A and B, which correspond to a monochrome image, is higher than the prescribed value, and the linear distribution score of the other jacket images C to E is equal to or lower than the prescribed value.

Next, the effect type selection unit 232 determines whether a contrast of the jacket image whose linear distribution score is determined to be higher than the prescribed value is lower than a prescribed value (S308). Then, the effect type selection unit 232 selects the effect type "monochrome" for the jacket image whose contrast is lower than the prescribed value, and selects the effect type "noise" for the jacket image whose contrast is equal to or higher than the prescribed value. Thus, the effect type selection unit 232 selects the effect type "monochrome" for the jacket image A and selects the effect type "noise" for the jacket image B.

On the other hand, the effect type selection unit 232 determines whether a color gradient score of the jacket image whose linear distribution score is determined to be equal to or lower than the prescribed value is lower than a prescribed value (S312). Then, the effect type selection unit 232 selects the effect type "posterization" for the jacket image whose color gradient score is lower than the prescribed value. The color gradient score is a score that has a lower value when a jacket image is composed of a set of monochrome regions without color change, such as a poster image.

Thus, the effect type selection unit 232 determines that the color gradient score of the jacket image C containing the background uniformly in black and the image of the moon uniformly in yellow to be lower than the prescribed value and therefore selects the effect type "posterization" for the jacket image C. On the other hand, the effect type selection unit 232 determines that the color gradient score of the other jacket images D and E are equal to or higher than the prescribed value. Specifically, the color gradient score is calculated as follows.

Edge extraction is performed by using a Sobel filter, for example. A response value indicating the color gradient at each point is obtained by the Sobel filter, and edge detection is performed by binary determination whether the response value is larger than a preset threshold or not. Further, the sum value of the response values at all the points where the response value is equal to or smaller than the threshold, which is non-edge points, is divided by the total number of the non-edge points and normalized, thereby calculating the color gradient score.

After that, the effect type selection unit 232 determines whether a chroma score of the jacket image whose color gradient score is determined to be equal to or higher than the prescribed value is lower than a prescribed value (S316). Then, the effect type selection unit 232 selects the effect type "tone effect" for the jacket image whose chroma score is lower than the prescribed value, and selects the effect type "color imitation" for the jacket image whose chroma score is equal to or higher than the prescribed value. The chroma score indicates the chroma of a jacket image and becomes lower in a jacket image having a lower chroma.

Thus, the effect type selection unit 232 selects the effect type "tone effect" for the jacket image D having a low chroma overall and selects the effect type "color imitation" for the jacket image E containing various colors.

If the second characteristic value of a jacket image is extremely small, the color distribution in the color space of the jacket image is linear. Thus, the second characteristic value of a jacket image can be used as an indicator that indicates how linear the color distribution in the color space of the jacket image is. Further, because an image in which the color distribution in the color space is close to be linear is considered to be close to monochrome, the second characteristic value of a jacket image may be used in stead of the chroma score in this embodiment.

Although the case of performing the determination of the chroma score subsequent to the determination of the color gradient score is described above, the present embodiment is not limited thereto. For example, the determination of the chroma score may be performed precedently to select the effective type "tone effect" for the jacket image whose chroma score is lower than the prescribed value, and then the determination of the color gradient score may be performed on the other jacket images. Then, the effective type "posterization" may be selected for the jacket image whose color gradient score is lower than the prescribed value, and the effective type "color imitation" may be selected for the jacket image whose color gradient score is equal to or higher than the prescribed value.

Hereinafter, how a certain photographic image changes as a result of effect processing by each of the above effect types is described with reference to FIGS. 26 to 31.

Figure 26:
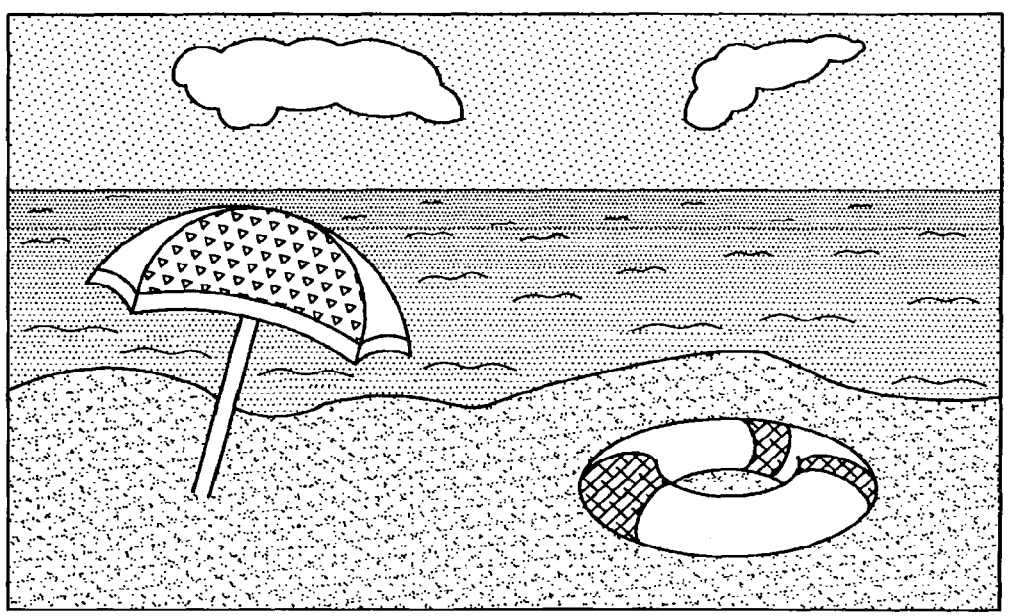
FIG. 26 is an explanatory view showing a specific example of a photographic image before effect processing.

FIG. 26 is an explanatory view showing a specific example of a photographic image before effect processing. The photographic image shown in FIG. 26 is an image of seaside which is composed of white cloud, blue (dot hatching) sky and sea, a beach parasol containing red (triangle hatching), a swim ring having a green stripe and so on. FIGS. 27 to 31 show results of performing the effect processing "monochrome", "noise", "posterization", "tone effect" and "color imitation", respectively, on the photographic image.

Figure 27:
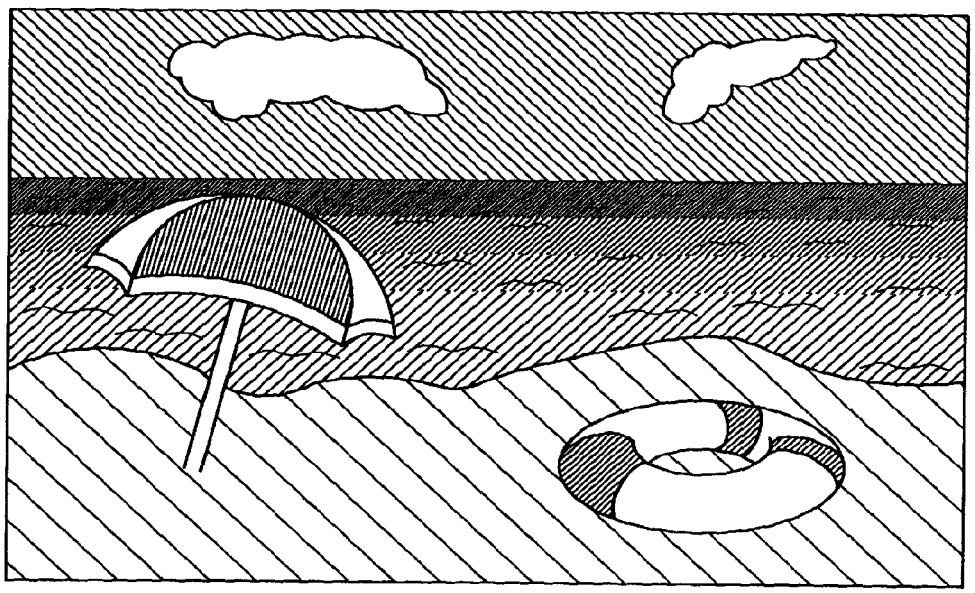
FIG. 27 is an explanatory view showing a result of performing effect processing "monochrome" on the photographic image shown in FIG. 26.

FIG. 27 is an explanatory view showing a result of performing the effect processing "monochrome" on the photographic image shown in FIG. 26. As shown in FIG. 27, the photographic image shown in FIG. 26 which contains various colors is converted into a monochrome image by the effect processing "monochrome".

Figure 28:
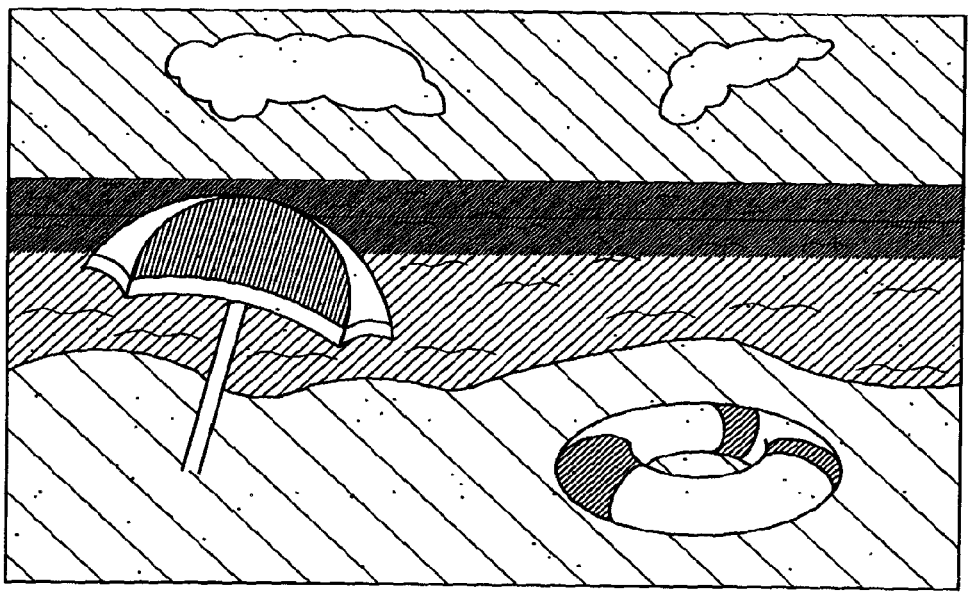
FIG. 28 is an explanatory view showing a result of performing effect processing "noise" on the photographic image shown in FIG. 26.

FIG. 28 is an explanatory view showing a result of performing the effect processing "noise" on the photographic image shown in FIG. 26. As shown in FIG. 28, the photographic image shown in FIG. 26 which contains various colors is converted into a monochrome image, random noises are added thereto, and the contrast is enhanced by the effect processing "noise".

Figure 29:
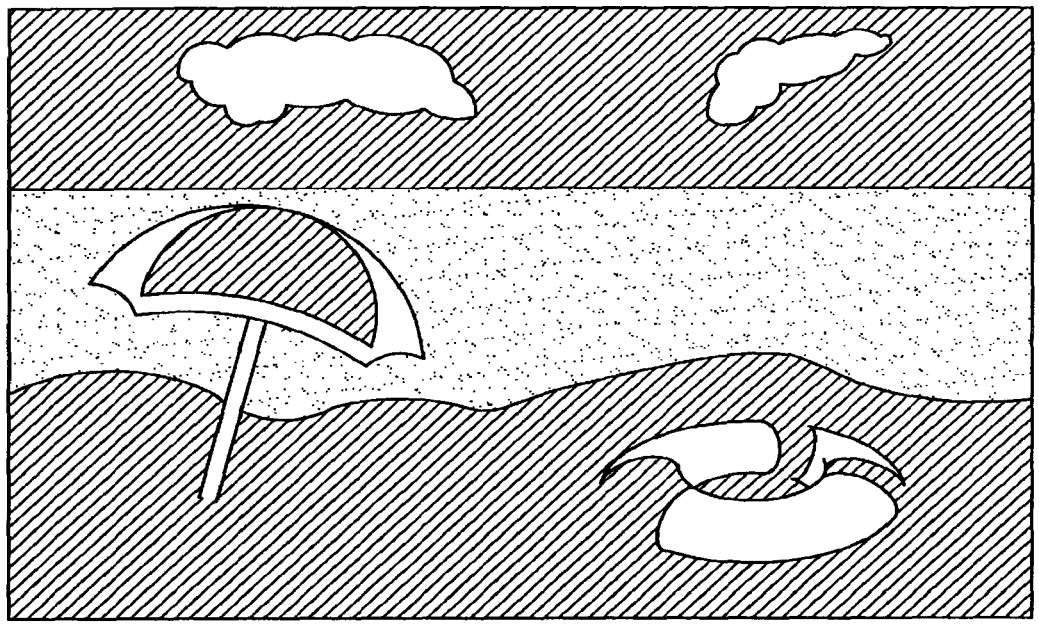
FIG. 29 is an explanatory view showing a result of performing effect processing "posterization" on the photographic image shown in FIG. 26.

FIG. 29 is an explanatory view showing a result of performing the effect processing "posterization" on the photographic image shown in FIG. 26. As shown in FIG. 29, the photographic image shown in FIG. 26 is converted into an image composed of a smaller number of colors by the effect processing "posterization". Because the processing based on the image analysis information of the jacket image C shown in FIG. 23 is assumed in FIG. 29, it shows the conversion of the photographic image into an image composed of yellow, white and black, which are contained in the jacket image C.

Figure 30:
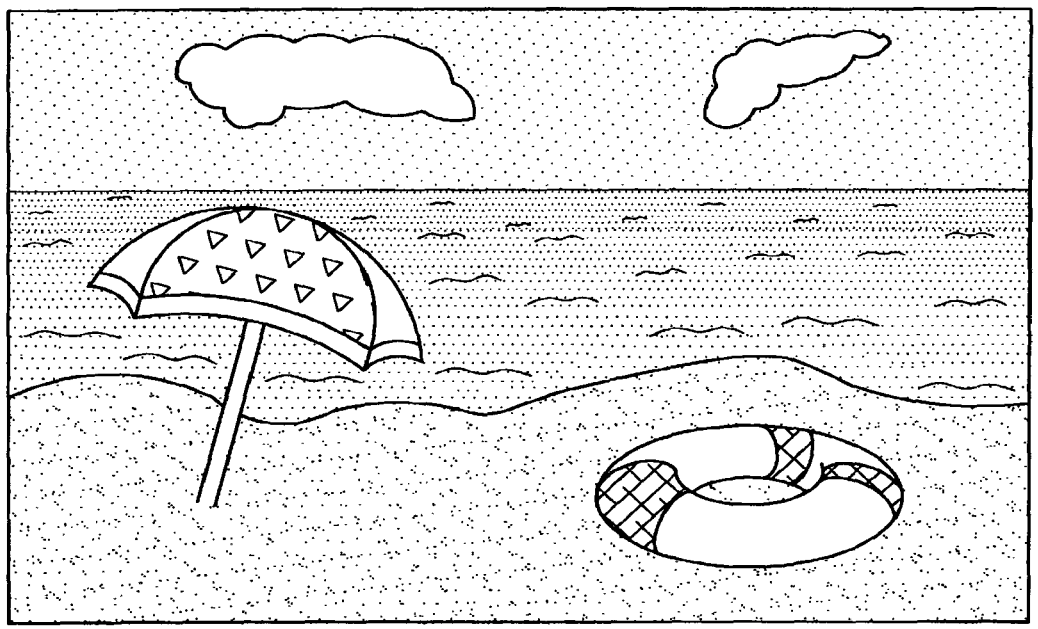
FIG. 30 is an explanatory view showing a result of performing effect processing "tone effect" on the photographic image shown in FIG. 26.

FIG. 30 is an explanatory view showing a result of performing the effect processing "tone effect" on the photographic image shown in FIG. 26. As shown in FIG. 30, the photographic image shown in FIG. 26 is converted into an image having tone like the jacket image D shown in FIG. 24 overall by the effect processing "tone effect". Specifically, because the jacket image D shown in FIG. 24 is composed of yellow and green with a low chroma overall, the photographic image shown in FIG. 26 is converted into an yellowish green image with a low chroma overall.

Figure 31:
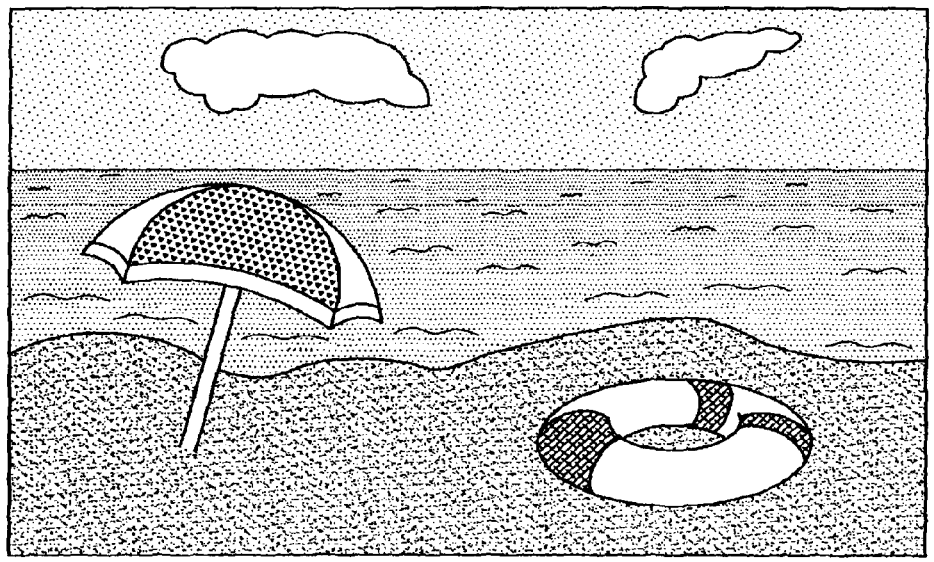
FIG. 31 is an explanatory view showing a result of performing effect processing "color imitation" on the photographic image shown in FIG. 26.

FIG. 31 is an explanatory view showing a result of performing the effect processing "color imitation" on the photographic image shown in FIG. 26. As shown in FIG. 31, in the photographic image shown in FIG. 26, the color contained in the jacket image is enhanced by the effect processing "color imitation". For example, if the jacket image is the jacket image E shown in FIG. 25 which contains red (triangle hatching) and green (oblique cross hatching), red and green parts in the photographic image are enhanced as shown in FIG. 31.

<10. Execution of Slideshow>

A display screen to be displayed on the video output unit 260 by a slideshow is described hereinafter with reference to FIGS. 32 to 36.

As described in the foregoing, in this embodiment, effect processing is performed on a photographic image so as to match the atmosphere of a jacket image. Further, in this embodiment, in order for a user to know that effect processing corresponding to the atmosphere of a jacket image is performed on a photographic image, the jacket image of music data is displayed at the start of playback of the music data as shown in FIG. 32.

Figure 32:
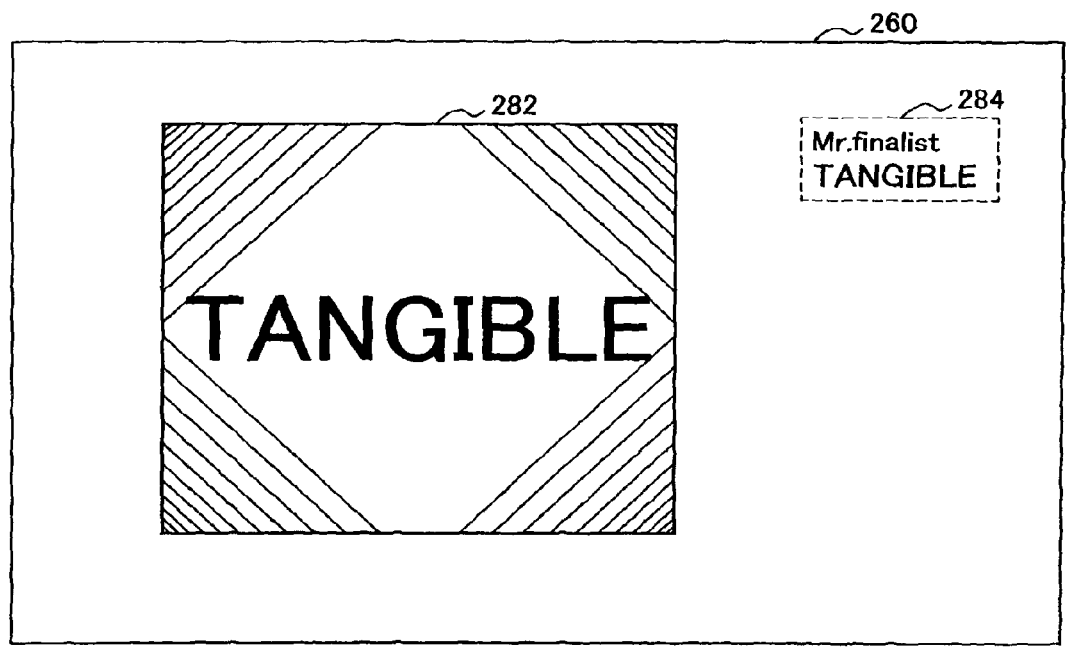
FIG. 32 is an explanatory view showing an example of a display screen displayed on a video output unit at the start of a slideshow.

FIG. 32 is an explanatory view showing an example of a display screen to be displayed on the video output unit 260 at the start of a slideshow. As shown in FIG. 32, the display screen includes a display region 282 of a jacket image and a display region 284 of additional information such as a title, an artist or the like of music data. Specifically, the additional information "Mr. finalist TANGIBLE" is described in the additional information display region 284 on the display screen shown in FIG. 32.

The font of the additional information is not uniform, and it may be selected according to the music feature amount of music data or the like. Specifically, the font selection unit 272 may select a font and a character color according to music data, and the display creation unit 276 may display the display screen that contains additional information represented by the selected font and character color. A method of selecting a font by the font selection unit 272 is described hereinafter with reference to FIGS. 33 to 35.

FIG. 33 is an explanatory view showing an example of the relationship of music mood and a font. As shown in FIG. 33, the font selection unit 272 may select a font corresponding to the mood of music in the music feature amount. For example, the font selection unit 272 may select the font "Helvetica Neue 95 Black" if the mood of music is Energetic.

Figure 34:
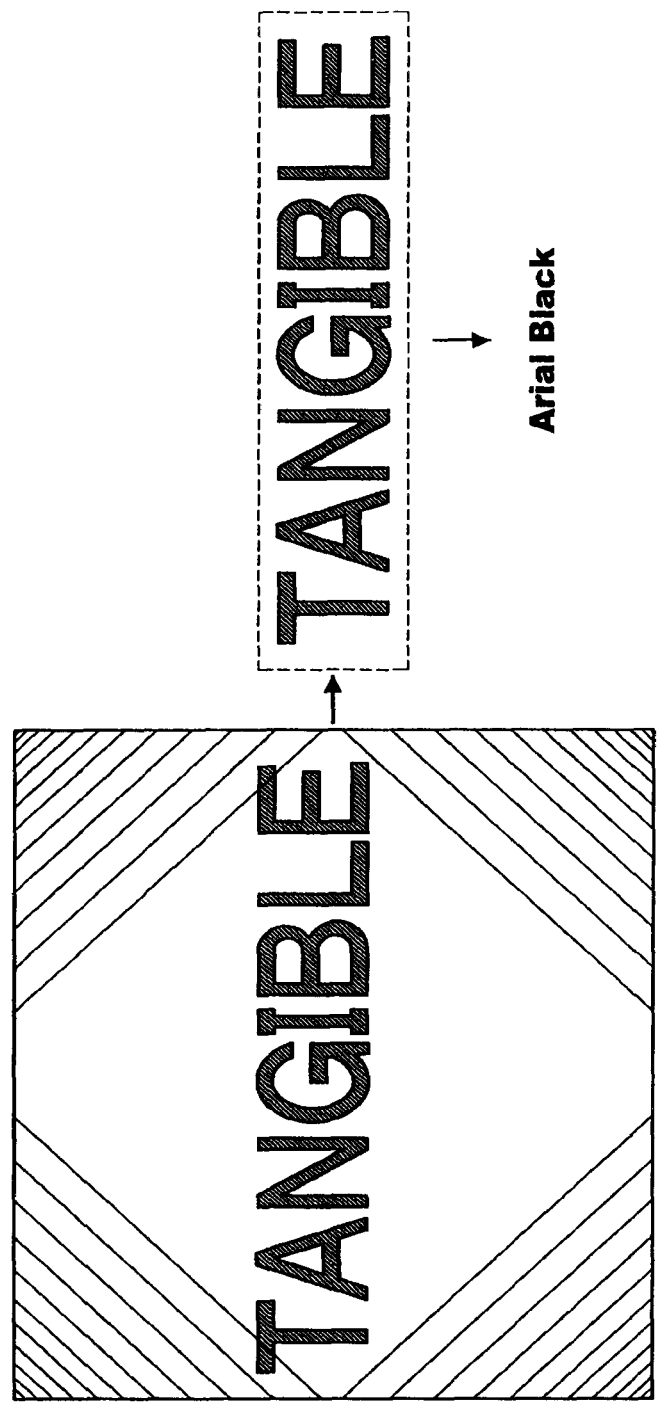
FIG. 34 is an explanatory view showing selection of a font based on image analysis information of a jacket image.

FIG. 34 is an explanatory view showing selection of a font based on image analysis information of a jacket image. As described above, if a character is contained in a jacket image, the font and the character color of the character are contained in the image analysis information that is obtained as a result of image analysis by the jacket analysis unit 228.

Thus, the font selection unit 272 may select a font that is identical or similar to the font contained in the image analysis information. For example, if a jacket image contains the character "TANGIBLE" as shown in FIG. 34, the font selection unit 272 may select the font "Arial Black" which is similar to the font of the character "TANGIBLE".

FIG. 35 is an explanatory view showing an example of the relationship of music genre and a font. As shown in FIG. 35, a font may be associated with each genre of music such as classic, pops, jazz or rock, and the font selection unit 272 may select a font corresponding to the genre of music.

Figure 36:
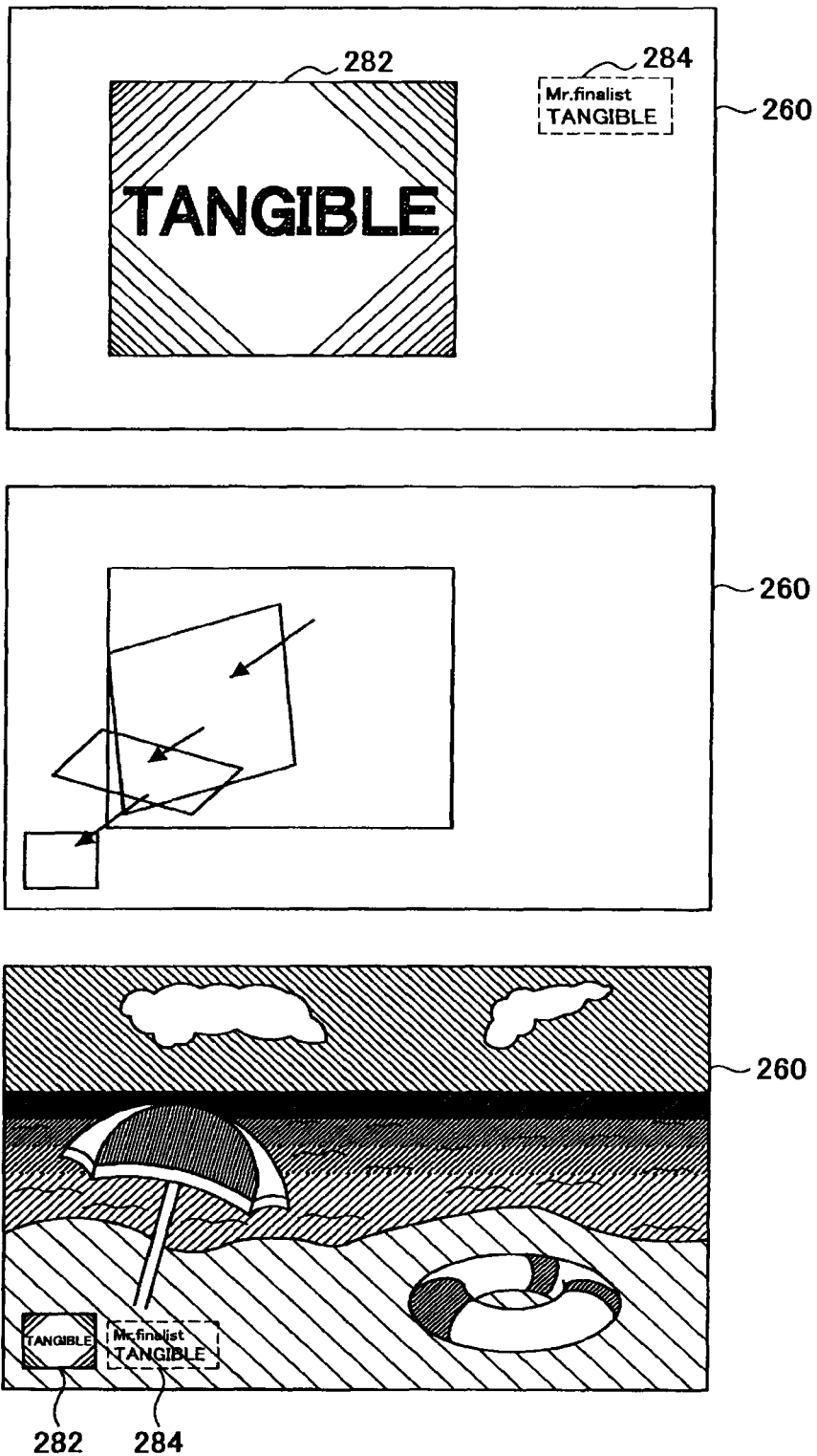
FIG. 36 is an explanatory view showing switching from a display screen displayed at the start of a slideshow to a photographic image on which effect processing is performed.

After displaying the display screen that contains the additional information of music data which is written by the above-described font and the jacket image, the screen is switched to display of a photographic image on which effect processing is performed as shown in FIG. 36.

FIG. 36 is an explanatory view showing switching from a display screen displayed at the start of a slideshow to a photographic image on which effect processing is performed. After a given period of time has passed from the display of the display screen shown in the upper part of FIG. 36, the display creation unit 276 moves the jacket image display region 282 to the lower left end part of the display screen, with the display region 282 spatially rotating and shrinking, as shown in the middle part of FIG. 36. Playback of music data is started at the same time as the display of the display screen as shown in the upper part of FIG. 36.

After that, a photographic image on which effect processing corresponding to the jacket image is performed is displayed as shown in the lower part of FIG. 36. The display creation unit 276 keeps the jacket image and the additional information of the music data displayed on the video output unit 260 after the display of the photographic image is started. In this configuration, the jacket image and the photographic image on which effect processing is performed are displayed on the same screen, so that a user can easily know that the effect processing is performed on the photographic image so as to match the jacket image.

<11. Summary and Supplementation>

As described in the foregoing, according to the embodiment, it is possible to display a photographic image of a user by performing effect processing corresponding to a jacket image of music data to be played back during execution of a slideshow with music. Further, according to the embodiment, it is possible to obtain a photographic image represented like an animation by changing the value of the parameter p in association with the playback time of music data.

Furthermore, in this embodiment, a display screen that contains a jacket image of music data and additional information of the music data is displayed at the start of a slideshow. Because the font of the additional information of the music data is selected based on the music feature amount of the music data or the font of the character in the jacket image, it is possible to allow the font of the additional information to match the music data to be played back, in addition to the effect processing performed on the photographic image. Further, in this embodiment, because the jacket image and the photographic image on which effect processing is performed are displayed on the same screen, a user can easily know that the effect processing is performed on the photographic image so as to match the jacket image.

It should be understood by those skilled in the art that various modifications, combinations, sub-combinations and alterations may occur depending on design requirements and other factors insofar as they are within the scope of the appended claims or the equivalents thereof.

For example, although the case of selecting the effect type according to the jacket image of music data is described in the foregoing, the present invention is not limited thereto. As an alternative example, a plurality of combinations of the effect type and the image analysis information may be prepared, and a combination to use may be selected randomly or selected according to the music feature amount of music data. For example, the effect control unit 252 may use a combination of the color histogram containing reddish color and the posterization if the tune of music data is intense, and may use a combination of the color histogram containing bluish color and the tone effect if the tune of music data is quiet.

Further, although a jacket image is described as an example of a relevant image of music data, the present invention is not limited thereto. For example, the relevant image may be an image of an artist of music data, an image contained in a Web page of an artist or the like. Furthermore, although the case where the PC 20 stores a jacket photograph, which is the relevant image, is described in the foregoing, the PC 20 may acquire the relevant image from outside when playing back music data. For example, the PC 20 may search for a relevant image of music data on the communication network 12 by using a title or an artist name contained in additional information of music data as a keyword. Then, the effect type selection unit 232 may select the effect type based on the image analysis information of the retrieved relevant image. In this case, because there is a possibility that an image less relevant to music data is retrieved, a character "no image", for example, may be displayed in the jacket image display region 282 without displaying the retrieved image, while the retrieved image is used for determination of the effect type. Alternatively, nothing may be displayed in the jacket image display region 282.

The present invention may be applied to uses other than a slideshow with music. For example, the present invention may be applied to a case of displaying an arbitrary display image on a background image. Specifically, the arbitrary display image may be used as the reference image (jacket image), and the background image may be used as the input image (photographic image). In this case, effect processing is performed on the background image so as to match the atmosphere of the display image, which offers a sense of uniformity. This enables use for an application that implements a pseudo-scrapbook on a computer, for example.

Further, it is not always necessary to perform each step in the processing of the PC 20 of the embodiment in chronological order according to the sequence shown in the flowchart. For example, each step in the processing of the PC 20 may include processing performed in parallel or individually (e.g. parallel processing or object processing).

Furthermore, it is possible to create a computer program that causes hardware such as the CPU 201, the ROM 201 or the RAM 202 incorporated in the PC 20 to perform the equal function to each element of the PC 20 described above. Further, a storage medium that stores such a computer program may be provided. Each functional block shown in the functional block diagram of FIG. 2 may be implemented by hardware, thereby achieving a series of processing on hardware.

The present application contains subject matter related to that disclosed in Japanese Priority Patent Application JP 2008-264564 filed in the Japan Patent Office on Oct. 10, 2008, the entire content of which is hereby incorporated by reference.

What is claimed is:

1. An information processing apparatus, comprising:
a central processing unit (CPU) configured to:
receive a request of audio data from a device;
select an image based on the audio data;
determine a character in the image and a first font of the character in the image;
replace the first font of the character in the image with a second font, wherein the second font is selected based on the audio data; and
provide the image with the second font of the character along with the audio data to the device.

2. The information processing apparatus according to claim 1, wherein the CPU is further configured to select the image based on at least one of a release date, a title, or a genre of the audio data.

3. The information processing apparatus according to claim 1, wherein the CPU is further configured to replace a color for the character based on the audio data.

4. An information processing method, comprising:
receiving, by a central processing unit (CPU), a request of audio data from a device;
selecting, by the CPU, an image based on the audio data;
determining, by the CPU, a character in the image and a first font of the character in the image;
replacing, by the CPU, the first font of the character in the image with a second font, wherein the second font is selected based on the audio data; and
providing, by the CPU, the image with the second font of the character along with the audio data to the device.

5. The information processing method according to claim 4, further comprising selecting the image based on at least one of a release date, a title, or a genre of the audio data.

6. The information processing method according to claim 4, further comprising replacing a color for the character based on the audio data.

7. A non-transitory computer-readable medium having stored thereon, computer-executable instructions for causing a computer to execute operations, the operations comprising:
receiving a request of audio data from a device;
selecting an image based on the audio data;
determining a character in the image and a first font of the character in the image;
replacing the first font of the character in the image with a second font, wherein the second font is selected based on the audio data; and
providing the image with the second font of the character along with the audio data to the device.

8. An information processing apparatus, comprising:
a central processing unit (CPU) configured to:
receive a request of audio data from a device;
select an image based on the audio data;
determine a character in the image and a first color of the character in the image;
replace the first color of the character in the image with a second color, wherein the second color is selected based on the audio data; and
provide the image with the second color of the character along with the audio data to the device.

* * * * *